United States Patent
Taniguchi et al.

(10) Patent No.: US 10,322,559 B2
(45) Date of Patent: *Jun. 18, 2019

(54) SHAPED PRODUCT HAVING STANDING PLANE, AND METHOD FOR MANUFACTURING THE SAME

(71) Applicant: Teijin Limited, Osaka-shi, Osaka (JP)

(72) Inventors: Michiharu Taniguchi, Matsuyama (JP); Motoomi Arakawa, Matsuyama (JP); Toru Sugiyama, Matsuyama (JP); Yasunori Nagakura, Matsuyama (JP)

(73) Assignee: Teijin Limited, Osaka-Shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/192,151

(22) Filed: Feb. 27, 2014

(65) Prior Publication Data

US 2014/0178631 A1 Jun. 26, 2014

Related U.S. Application Data

(63) Continuation of application No. PCT/JP2012/071891, filed on Aug. 29, 2012.

(30) Foreign Application Priority Data

Aug. 31, 2011 (JP) .................................. 2011-189033
Aug. 31, 2011 (JP) .................................. 2011-189034

(51) Int. Cl.
*B32B 1/00* (2006.01)
*B32B 1/02* (2006.01)
(Continued)

(52) U.S. Cl.
CPC ................ *B32B 1/00* (2013.01); *B29C 70/12* (2013.01); *B29C 70/46* (2013.01); *C08J 5/04* (2013.01);
(Continued)

(58) Field of Classification Search
CPC .... B32B 1/02; B32B 5/02; B32B 1/00; B32B 17/04; Y10T 428/13; Y10T 428/1314;
(Continued)

(56) References Cited

U.S. PATENT DOCUMENTS 5,128,200 A * 7/1992 Colley et al. .............. 428/298.1
5,194,462 A 3/1993 Hirasaka et al.
(Continued)

FOREIGN PATENT DOCUMENTS

EP 0483716 A1 5/1992
EP 2682418 A1 1/2014
(Continued)

OTHER PUBLICATIONS

International Preliminary Report on Patentability for corresponding Application No. PCT/JP2012/071891, completed Dec. 16, 2013.
(Continued)

*Primary Examiner* — Joanna Pleszczynska
(74) *Attorney, Agent, or Firm* — Banner & Witcoff, Ltd.

(57) ABSTRACT

There is provided a shaped product made of a fiber-reinforced composite material including reinforcing fibers having an average fiber length of 5 to 100 mm and a thermoplastic resin. In the shaped product, a volume fraction of reinforcing fibers is 5 to 80%, a reference plane (S) and a standing plane (B) inclined at an angle of 45 to 90 degrees with respect to the reference plane are included, a ratio of an area of the standing plane (B) to an area of the reference plane (S) is 0.5 to 100, and in the fiber-reinforced composite material constituting the shaped product, a ratio of a reinforcing fiber bundle (A) including the reinforcing fibers of a critical number of single fiber or more to the total amount of the reinforcing fibers is 20 Vol % or more and 99 Vol % or less.

22 Claims, 12 Drawing Sheets

(51) Int. Cl.
| | |
|---|---|
| *B32B 5/02* | (2006.01) |
| *B32B 17/04* | (2006.01) |
| *B29C 43/14* | (2006.01) |
| *B29C 70/12* | (2006.01) |
| *B29C 70/34* | (2006.01) |
| *B29C 70/40* | (2006.01) |
| *B29C 70/46* | (2006.01) |
| *C08J 5/04* | (2006.01) |
| *B29K 101/12* | (2006.01) |
| *B29K 105/12* | (2006.01) |
| *B29K 105/08* | (2006.01) |

(52) U.S. Cl.
CPC .......... *B29C 43/14* (2013.01); *B29K 2101/12* (2013.01); *B29K 2105/0854* (2013.01); *B29K 2105/12* (2013.01); *Y10T 428/2419* (2015.01); *Y10T 428/24264* (2015.01)

(58) Field of Classification Search
CPC ....... Y10T 428/1321; Y10T 428/24058; Y10T 428/24124; B29C 70/12; B29C 70/40; B29C 70/46; B29C 43/14
USPC ......... 428/34.1, 34.5, 34.7, 121, 130, 298.1, 428/299.1, 299.4, 299.7
See application file for complete search history.

(56) References Cited

U.S. PATENT DOCUMENTS

| | | | | |
|---|---|---|---|---|
| 5,264,259 | A * | 11/1993 | Satoh et al. | 428/34.5 |
| 5,599,496 | A * | 2/1997 | Krishnakumar | B29C 49/0073 264/532 |
| 5,681,887 | A | 10/1997 | Ikeda et al. | |
| 5,883,023 | A | 3/1999 | Martine et al. | |
| 6,068,715 | A * | 5/2000 | Yokokita et al. | 156/62.2 |
| 6,457,602 | B2 * | 10/2002 | Uchiyama | 220/669 |
| 2008/0180002 | A1* | 7/2008 | Kameoka | 312/7.2 |
| 2010/0178495 | A1* | 7/2010 | Taketa | B29C 70/14 428/339 |
| 2011/0143110 | A1 | 6/2011 | Tsuchiya et al. | |
| 2012/0181716 | A1* | 7/2012 | Brentrup | B29C 70/506 264/45.3 |
| 2013/0317161 | A1 | 11/2013 | Konagai et al. | |
| 2013/0344282 | A1 | 12/2013 | Yagi et al. | |

FOREIGN PATENT DOCUMENTS

| | | |
|---|---|---|
| EP | 2716433 A1 | 4/2014 |
| EP | 2740578 A1 | 6/2014 |
| JP | H06-306219 A | 11/1994 |
| JP | H06-335934 A | 12/1994 |
| JP | H06-344431 A | 12/1994 |
| JP | H07-067694 B2 | 7/1995 |
| JP | H08-294918 A | 11/1996 |
| JP | H10-193350 A | 7/1998 |
| JP | 2000-043066 A | 2/2000 |
| JP | 2009-196145 A | 9/2009 |
| JP | 2009-286817 A | 12/2009 |
| JP | 2010-253938 A | 11/2010 |
| JP | 2011011362 A | 1/2011 |
| WO | 2012-105080 A1 | 8/2012 |
| WO | 2012/117593 A1 | 9/2012 |

OTHER PUBLICATIONS

Jan. 7, 2015—(EP) Supplementary Search Report—App 12828442.
Harper et al., "Characterisation of random carbon fibre composites from a directed fibre preforming process: The effect of tow filamentisation", Composites Part A: Applied Science and Manufacturing, Elsevier Science Publishers, B.V., Amsterdam, NL, vol. 38, No. 3, Dec. 15, 2006, pp. 755-770.
D.R. Mulligan et al, "Fibre-bundling in a short-fibre composite: 1. Review of literature and development of a method for controlling the degree of bundling", Composites Science and Technology, vol. 63, No. 5, Apr. 1, 2003, pp. 715-725.
International Search Report issued in corresponding International Patent Application No. PCT/JP2012/071891 dated Dec. 4, 2012.
Feb. 9, 2015—(EP) Office Action—App 12828442.9.
Aug. 31, 2016—(EP) Communication re: Third Party Observation—App 12828442.9.
Harper, Lee T., Turner, Thomas A., and Warrior, Nicholas A., "A Random Fibre Network Model for Predicting the Stochastic Effects of Discontinuous Fibre Composites," 16th International Conference on Composite Materials, pp. 1-10.
Oct. 20, 2015—(EP) Office Action—App 12828442.9.
Wakeman, M.D., Blanchard, P., and Manson, J.-A. E., "Void Evolution During Stamp-Forming of Thermoplastic Composites," 15th International Conference on Composite Materials (ICCM-15), Jun. 27 to Jul. 1, 2005.
Aug. 17, 2015—(EP) Communication re: Third Party Observations—App 12828442.9.
Tetsu, Matoba; Uchino, Hiroyuki; Nozawa, Tadamichi; Murata, Akihiro; Kimura, Takao; Ohno, Kenyu; Nishitani, Teruyuki; and Ohsawa, Toshiyuki, "Fiber reinforced Thermoplastic: Stampable Sheet," 1993, pp. 67-72.
Jespersen, S.T., Baudry, F., Wakeman, M.D., Michaud, V., Blanchard, P., Norris, R., and Manson, J-A.E., "Consolidation of Net-shape Random Fiber Thermopolastic Composite Preforms," Polymer Composites—2010, pp. 653-665.
Jespersen, S.T., Baudry, F., Wakeman, M.D., Michaud, V., Blanchard, P., Norris, R., and Manson, J-A. E., "Flow Properties of Tailored Net-Shape Thermoplastic Composite Preforms," App Campos Mater (2009) 16: pp. 331-344.
Feb. 15, 2018—(EP) Office Action—App 12828442.9.

* cited by examiner

SHAPED PRODUCT HAVING STANDING PLANE, AND METHOD FOR MANUFACTURING THE SAME

CROSS-REFERENCE TO RELATED APPLICATION(S)

This application is a continuation of PCT International Application No. PCT/JP2012/071891, filed on Aug. 29, 2012, which claims priority under 35 U.S.C. § 119(a) to Japanese Patent Application Nos. 2011-189033 filed on Aug. 31, 2011, and 2011-189034 filed on Aug. 31, 2011, respectively, all of which are hereby expressly incorporated by reference into the present application.

TECHNICAL FIELD

The present disclosure relates to a shaped product which is made of a fiber-reinforced composite material including a reinforcing fiber and a thermoplastic resin and has a reference plane (S) and a plane (B) (hereinafter, referred to as "standing plane (B)") positioned around the reference plane (S) at an angle of 45 degrees or more and 90 degrees or less, and a method for manufacturing the shaped product. In particular, the present disclosure relates to a shaped product which is isotropic and made of a fiber-reinforced composite material, a shaped product which has a standing plane with typical difficulty in integral molding, such as a standing plane (B) having a steep gradient or being thin-walled, and a method for manufacturing these shaped products.

BACKGROUND ART

A fiber-reinforced composite material in which carbon fibers, aramid fibers, glass fibers or the like are used as reinforcing fibers has been widely utilized for structural materials of aircrafts, vehicles or the like, or in general industries and sports such as a tennis racket, a golf club shaft and a fishing rod by utilizing high specific strength and high specific elasticity thereof.

For example, Patent Document 1 describes a stamping molding material molded obtained by heating and pressurizing a composite laminate made from a glass fiber sheet body containing a thermoplastic resin to mold the composite laminate in a sheet form, and a method for manufacturing the stamping molding material. According to Patent Document 1, although a stereoscopic product can be manufactured by an integral molding method in a short tact time, since it is difficult to control fiber orientation due to fluidity, it is difficult to obtain a shaped product which is thermally and mechanically isotropic and has less warpage attributed to differential shrinkage caused by orientation.

Patent Document 2 describes a layered base material which is made of a prepreg base material including unidirectionally oriented reinforcing fibers and a thermoplastic resin and has some portions with different layer thicknesses.

However, in order for the layered base material to be thermally and mechanically isotropic, a plurality of prepreg base materials need to be layered such that the reinforcing fibers are isotropically placed, and there are many limitations in preparing base materials, performing a molding process, and designing a product.

In the injection molding field, since a reinforcing fiber may be cut or broken by a screw during an injection molding process, it is difficult to obtain a shaped product made of a fiber-reinforced composite material including a reinforcing fiber with a long fiber length. Accordingly, development of a shaped product which is made of a fiber-reinforced composite material using a reinforcing fiber with a fiber length of 1 mm or less has been carried out. However, since such a shaped product includes the reinforcing fiber with a short fiber length, a mechanical property, or the like, is not sufficient. Further, this shaped product has a problem that the reinforcing fiber is oriented in a flow direction of a molten resin during a molding process, so that a physical property tends to be anisotropic.

Thus, a shaped product, which includes a reinforcing fiber with a long fiber length and a thermoplastic resin, has an isotropic property, and is made of a fiber-reinforced composite material having an excellent physical property, has not been developed sufficiently. In particular, a shaped product having a standing plane inclined at about 90 degrees with respect to a reference plane, a shaped product having an extremely small corner R (curvature) between a reference plane and a standing plane, a shaped product having a thin-walled standing plane, and a shaped product having an extremely deep standing plane, which are made of an isotropic fiber-reinforced composite material and have a physical property endurable to practical use, have not been achieved.

CITATION LIST

Patent Document

Patent Document 1: Japanese Patent Application Laid-Open No. H10-193350
Patent Document 2: Japanese Patent Application Laid-Open No. 2009-286817

SUMMARY OF INVENTION

Problems to be Solved

An object of the present disclosure is to provide a shaped product which is made of a fiber-reinforced composite material including reinforcing fibers having an average fiber length of 5 mm or more and 100 mm or less and a thermoplastic resin and has a standing plane (B), and in particular, to provide a shaped product having a standing plane (B) which is typically difficult to integral mold, such as a standing plane (B) inclined at about 90 degrees with respect to a reference plane (S), a standing plane (B) having an extremely small corner R between the reference plane (S) and the standing plane (B), a standing plane (B) being a thin-walled, or a standing plane (B) being an extremely deep, and a method for manufacturing these shaped products. Further, another object of the present disclosure is to provide a shaped product in which an isotropic property of fibers can be maintained and fiber content is uniformly maintained at each portion.

Solution to Problem

The present inventors found that a shaped product made of a fiber-reinforced composite material including reinforcing fibers having an average fiber length of 5 mm or more and 100 mm or less and a thermoplastic resin, having a standing plane, and having an excellent physical property can be provided by using a random mat having a random reinforcing fiber (reinforcing fiber mat) including a fiber bundle satisfying a specific opening condition and a thermoplastic resin and press-molding a molding precursor having a low charge ratio with respect to a mold shape.

That is, the present disclosure relates to a shaped product made of a fiber-reinforced composite material including reinforcing fibers having an average fiber length of 5 mm or more and 100 mm or less and a thermoplastic resin, wherein a volume fraction of reinforcing fibers of the shaped product is 5 to 80 Vol %, the shaped product has a reference plane (S) and a plane (B) (hereinafter, referred to as "standing plane (B)") inclined at an angle of 45 degrees or more and 90 degrees or less with respect to the reference plane, a ratio of an area of the standing plane (B) to an area of the reference plane (S) is 0.5 to 100, and in the fiber-reinforced composite material constituting the shaped product, a ratio of a reinforcing fiber bundle (A) including the reinforcing fibers of a critical number of single fiber or more, the critical number being defined by the following Formula (1), to the total amount of the reinforcing fibers is 20 Vol % or more and 99 Vol % or less:

Critical number of single fiber=600/D  (1)

(wherein D is an average fiber diameter (μm) of single reinforcing fiber).

The present disclosure relates to a method for manufacturing the shaped product by using a random mat including reinforcing fibers having an average fiber length of 5 mm or more and 100 mm or less and a thermoplastic resin, wherein a fiber areal weight of the reinforcing fibers is 25 to 10000 g/m², and a ratio of a reinforcing fiber bundle (A) including the reinforcing fibers of a critical number of single fiber or more, the critical number being defined by the following Formula (1), to the total amount of the reinforcing fibers is 20 Vol % or more and 99 Vol % or less:

Critical number of single fiber=600/D  (1)

(wherein D is an average fiber diameter (μm) of single reinforcing fiber).

The method includes the following steps A-1) to A-3) for performing an impregnation process and a molding process:

A-1) a step of obtaining a prepreg by heating and pressurizing the random mat to a temperature equal to or higher than a melting point and lower than a decomposition temperature when the thermoplastic resin is crystalline and to a temperature equal to or higher than a glass transition temperature and lower than the decomposition temperature when the thermoplastic resin is amorphous to impregnate the thermoplastic resin into the reinforcing fiber bundle;

A-2) a step of arranging the prepreg obtained in step A-1) in a mold whose temperature is adjusted to a temperature lower than the melting point when the thermoplastic resin is crystalline or to a temperature lower than the glass transition temperature when the thermoplastic resin is amorphous, and the mold which has a reference plane (S) and a standing plane (B), after the prepreg obtained in step A-1) is heated to a temperature equal to or higher than the melting point and lower than the decomposition temperature when the thermoplastic resin is crystalline or to a temperature equal to or higher than the glass transition temperature and lower than the decomposition temperature when the thermoplastic resin is amorphous; and A-3) a step of pressurizing and molding the prepreg arranged in the mold in step A-2).

Or, the method includes the following steps B-1) to B-4) for performing an impregnation process and a molding process:

B-1) a step of arranging the random mat in a mold having a reference plane (S) and a standing plane (B);

B-2) a step of pressurizing the random mat while heating the mold to a temperature equal to or higher than a melting point of the thermoplastic resin and lower than a decomposition temperature when the thermoplastic resin is crystalline or to a temperature equal to or higher than a glass transition temperature and lower than the decomposition temperature when the thermoplastic resin is amorphous (first press step);

B-3) a step of pressurizing the random mat in at least one pressure step so as to allow a pressure of the final pressure step to be 1.2 to 100 times greater than the pressure of the first press step (second press step); and B-4) a step of molding the random mat by adjusting a temperature of the mold to be lower than the melting point when the thermoplastic resin is crystalline and to be lower than the glass transition temperature when the thermoplastic resin is amorphous.

EFFECT OF INVENTION

According to the present disclosure, it is possible to provide a shaped product which is made of a fiber-reinforced composite material including reinforcing fibers having an average fiber length of 5 mm or more and 100 mm or less and a thermoplastic resin, and having a standing plane at least in part, and particularly, to provide a shaped product, which has a standing plane with typical difficulty in molding, such as a standing plane having a steep gradient or being thin-walled, by an integral molding method. According to the present disclosure, it is possible to provide a shaped product which is capable of maintaining an isotropic property of reinforcing fibers, and has a complicated three-dimensional shape with excellent surface appearance, such as thin thickness, lightweight, and high rigidness.

According to the present disclosure, it is possible to preferably provide housings for electrical and electronic equipment, parts for automobiles, and general industrial parts.

BRIEF DESCRIPTION OF DRAWINGS

In FIG. 3, a solid line indicates the mold, and a broken line indicates the arrangement of the base material.

DESCRIPTION OF EMBODIMENTS

Figure 1:
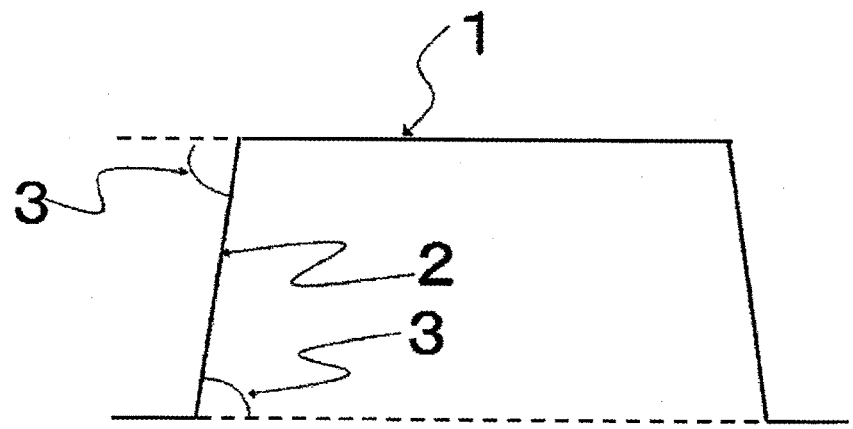
FIG. 1 is a cross-sectional view of a mold (of a core mold) illustrating an example of a standing plane and a standing plane angle.

Hereinafter, embodiments of the present disclosure will be described in sequence, but the present disclosure is not limited thereto.

There is provided a shaped product made of a fiber-reinforced composite material including reinforcing fibers having an average fiber length of 5 mm or more and 100 mm or less and a thermoplastic resin, wherein a volume fraction of reinforcing fibers of the shaped product is 5 to 80 Vol %, the shaped product has a reference plane (S) and a plane (B) (hereinafter, referred to as "standing plane (B)") inclined at an angle of 45 degrees or more and 90 degrees or less with respect to the reference plane, a ratio of an area of the standing plane (B) to an area of the reference plane (S) is 0.5 to 100, and in the fiber-reinforced composite material constituting the shaped product, a ratio of a reinforcing fiber bundle (A) including the reinforcing fibers of a critical number of single fiber or more, the critical number being defined by the following Formula (1), to the total amount of the reinforcing fibers is 20 Vol % or more and 99 Vol % or less:

$$\text{Critical number of single fiber} = 600/D \tag{1}$$

(wherein D is an average fiber diameter (μm) of single reinforcing fiber).

When the ratio of the reinforcing fiber bundle (A) to the total amount of the reinforcing fibers included in the fiber-reinforced composite material is out of the above-described range, a problem to be described below with regard to a random mat occurs.

In the shaped product of the present disclosure, the ratio of the reinforcing fiber bundle (A) is more preferably 30 Vol % or more to less than 90 Vol %, and still more preferably 30 Vol % or more to less than 80 Vol %.

In the shaped product of the present disclosure, the fiber-reinforced composite material constituting the shaped product meets a volume fraction of reinforcing fibers (Vf) of 5 to 80%, which is defined by the following formula.

Volume fraction of reinforcing fibers (Vf)=100×volume of reinforcing fibers/(volume of reinforcing fibers+volume of thermoplastic resin).

When the volume fraction of reinforcing fibers is lower than 5%, a reinforcing effect may not be sufficiently exhibited. Further, when the volume fraction of reinforcing fibers is higher than 80%, since a void is easily caused in the obtained shaped product, a physical property of the shaped product may be deteriorated. The volume fraction of reinforcing fibers is more preferably in a range of 20 to 60%

In the shaped product of the present disclosure, an average number (N) of the reinforcing fibers of the reinforcing fiber bundle (A) included in the fiber-reinforced composite material preferably satisfies the following Formula (2).

$$0.7\times10^4/D^2 < N < 1\times10^5/D^2 \tag{2}$$

(wherein D is an average fiber diameter (μm) of single reinforcing fiber).

When the average number (N) of the reinforcing fibers of the reinforcing fiber bundle (A) is equal to or less than $0.7\times10^4/D^2$, it may be difficult to provide a shaped product having a high volume fraction of reinforcing fibers (Vf). Further, when the average number (N) of the reinforcing fibers of the reinforcing fiber bundle (A) is equal to or more than $1\times10^5/D^2$, a thick portion may be locally formed, so that a void is caused. More preferably, the average number of the reinforcing fibers of the reinforcing fiber bundle (A) satisfies the following Formula (2').

$$0.7\times10^4/D^2 < N < 6\times10^4/D^2 \tag{2'}$$

(wherein D is an average fiber diameter (μm) of single reinforcing fiber.)

Hereinafter, configuration requirements, features, or preferable aspects of the shaped product of the present disclosure will be described in detail.

[Reference Plane]

In the present disclosure, a reference plane (S) refers to a part which has a substantially planar shape and is the basis of a standing plane, in a shaped product or a mold for obtaining the shaped product. A plate thickness of the reference plane is not particularly limited but may be preferably in a range of 0.2 to 5 mm and more preferably in a range of 1 to 3 mm. A plate thickness of the reference plane does not need to be uniform and can be increased or decreased locally. In this case, there is no particular limitation in an increase/decrease ratio of a plate thickness, but the increase/decrease ratio may be preferably in a range of 30 to 300% and more preferably in a range of 50 to 200% with respect to the plate thickness of the reference plane to be the basis. The plate thickness may be gradually changed or may be continuously changed by allowing the reference plane to be tapered or curved. Preferably, the plate thickness is continuously changed to avoid stress concentration.

[Standing Plane]

In the present disclosure, a standing plane (B) refers to a plane (B) positioned around the above-described reference plane (S) at an angle of 45 degrees or more and 90 degrees or less with respect to the reference plane (S). For example, an angle (standing plane angle) 3 formed by a reference plane 1 and a standing plane 2 is as illustrated in FIG. 1.

As the angle 3 of the standing plane with respect to the reference plane 1 becomes closer to 90 degrees, fluidity of a base material is likely to be impeded. For example, when the object is a thin-walled shaped product having the standing plane 2 with a thickness of 1 mm or less, as the angle 3 with respect to the reference plane (S) 1 is smaller, it becomes easy to mold. However, in the present disclosure, since the reinforcing fibers are mixed in a specific pattern, it is possible to provide a shaped product including a standing plane having a steep gradient in a range of 45 degrees or more and 90 degrees or less with respect to the reference plane (S).

In the shaped product of the present disclosure, a ratio of an area of the standing plane (B) to an area of the reference plane (S) is 0.5 to 100, more preferably 1 to 50, and still more preferably 1 to 20. The ratio is an indicator of a depth of the standing plane (B). In particular, when the standing plane (B) is inclined at an angle of 80 degrees or more and 90 degrees or less with respect to the reference plane (S) (hereinafter, the standing plane (B) inclined at an angle of 80 degrees or more and 90 degrees or less with respect to the reference plane (S) may be particularly referred to as "standing plane (B')") and a ratio of an area of the standing plane (B') to an area of the reference plane (S) is in a range of 1 to 20, the technical significance of the present disclosure becomes more clear. When a ratio of an area of the standing plane (B) to an area of the reference plane (S) is less than 0.5, a standing plane can be formed by contriving molding methods independent from the present disclosure. When a ratio of an area of the standing plane (B) to an area of the reference plane (S) is more than 100, since a flow distance of a softened and molten molding precursor becomes excessively long during a molding process, the molding precursor may be easily solidified due to loss of heat to a mold during the molding process, and a desired shaped product may not be obtained.

There is no particular limitation in a thickness of the standing plane (B), but the thickness may be preferably 0.5 mm to 50 mm, and more preferably 1 mm to 30 mm Still more preferably, the thickness of the standing plane (B) is 1 mm to 10 mm. When the thickness of the standing plane (B) is smaller than 0.5 mm, the softened and molten molding precursor may be easily solidified due to loss of heat to the mold during the molding process, and a desired shaped product may not be obtained. When the thickness of the standing plane (B) is greater than 50 mm, since it takes a time to cool the shaped product after the molding process, productivity is adversely affected.

[Auxiliary Flow Path (C)]

The shaped product of the present disclosure may include an auxiliary flow path (C), or may include an auxiliary flow path (C) in addition to the above-described standing plane (B).

Figure 7:
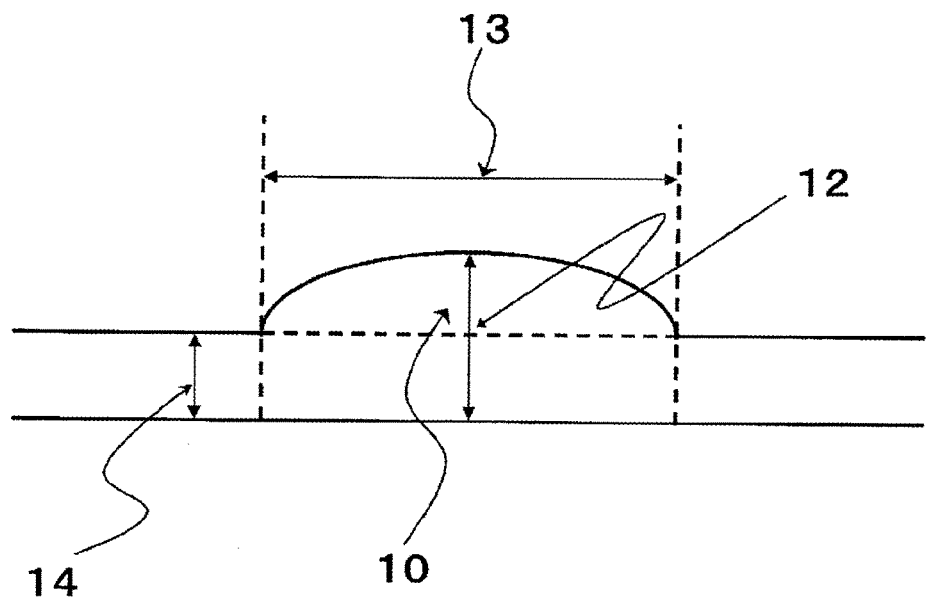
FIG. 7 is a cross-sectional view of an auxiliary flow path (C) of Example 3.

In the present disclosure, the auxiliary flow path (C) strictly refers to a groove formed in, for example, a mold when a molding process is carried out by allowing a prepreg or a random mat to flow. A shape of the auxiliary flow path (C) is reflected on a shape of the shaped product. FIG. 7 is a schematic diagram of the auxiliary flow path (C). That is, the shaped product of the present disclosure is described as including the auxiliary flow path (C) for convenience sake, and more accurately, the shaped product includes a column-shaped thick portion resulting from the auxiliary flow path (C) of the mold used in the molding process.

The auxiliary flow path (C) in the shaped product of the present disclosure, preferably, satisfies any one of the following conditions i) to iii), more preferably satisfies the condition i), and still more preferably satisfies all the conditions i) to iii).

i) A thickness (b) of the auxiliary flow path (C) with respect to a thickness (a) of a part of the shaped product at which the auxiliary flow path (C) is formed is 1.1 or more and 30 or less.

ii) A ratio of a width (c) of the auxiliary flow path (C) with respect to the thickness (a) of the shaped product is 0.1 or more and 10 or less.

iii) A cross sectional area (d) of the auxiliary flow path (C) satisfies Formula (3).

Cross sectional area $(d)$ of auxiliary flow path $(C)$≥Thickness $(a)$ of shaped product×Thickness $(a)$ of shaped product×1.05 \hfill (3)

Since the shaped product includes the auxiliary flow path (C), a complicated shape can be molded by allowing a base material to facilitate fluidity, so that a reinforcing effect can be obtained and warpage can be reduced.

[Chamfer Portion (D)]

Figure 17:
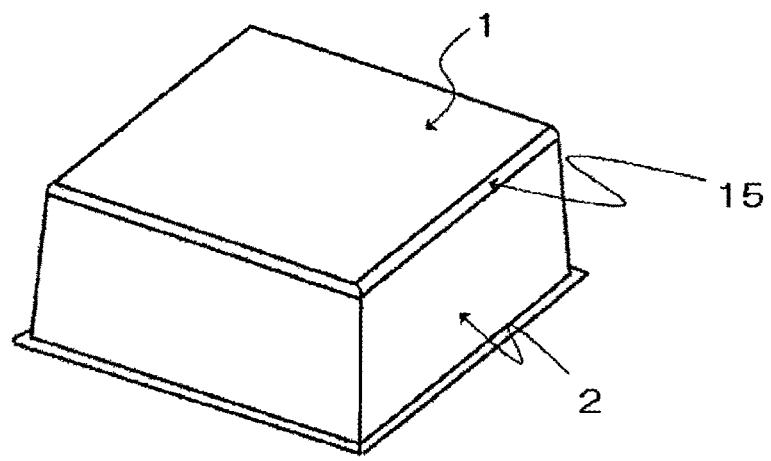
FIG. 17 is a schematic diagram of a mold (in a core mold) used in Example 7.

The shaped product of the present disclosure may include a chamfer portion (D) at the boundary of the reference plane (S) and the standing plane (B) as illustrated in FIG. 17, or the like, in addition to the standing plane (B), or may include a chamfer portion (D) and the above-described auxiliary flow path (C).

In the shaped product of the present disclosure, an angle between the reference plane (S) and the standing plane (B) can be set freely, but in a complicated stereoscopic shape, an angle of a high gradient is usually needed. However, in a case where a gradient formed by the reference plane (S) and the standing plane (B) is high, when a large base material is placed to envelop the planes and molded, since wrinkles are likely to occur at the boundary of the reference plane (S) and the standing plane (B), the shaped product may be non-uniform in thickness. When a molding process is carried out by allowing a small base material to flow, since a flow of the base material is likely to be impeded at the boundary of reference plane (S) and the standing plane (B), a desired shaped product may not be obtained.

Regarding the above-described problem, due to the chamfer portion (D) formed at the boundary of reference plane (S) and the standing plane (B), it becomes easy to carry out a flow molding with a simple and small base material and it becomes easier to obtain a shaped product uniform in thickness.

The above-described chamfer portion (D) may have a curved surface or a plane surface. When the chamfer portion (D) has a curved surface, the curved surface may be a concave surface or a convex surface.

In the shaped product of the present disclosure, a ratio of a maximum thickness (L2) of the chamfer portion (D) to a thickness (L1) of the standing plane (B) of the shaped product is preferably 0.9 or more. Further, the ratio (L2/L1) is preferably 1 or more, and more preferably 1.1 or more. The upper limit of the ratio is not particularly set, but it is preferably 5 or less in consideration of a thin thickness.

In the shaped product of the present disclosure, the chamfer portion (D) may be formed at only one or both of the inner side or the outer side of the shaped product.

When the chamfer portion (D) has a curved surface, R (curvature) is not particularly limited, but both of the inner side and the outer side may have R in a range of preferably 1 mm to 300 mm, and more preferably 3 mm to 50 mm. When the R is smaller than 1 mm, the chamfer portion (D) may not function as a chamfer portion. When the R is excessively great, the boundary may be excessively expanded. A thickness of the shaped product at the chamfer portion (D) does not need to be uniform and can be increased or decreased locally. There is no particular limitation in an increase/decrease ratio of a thickness of the shaped product at the chamfer portion (D), but the increase/decrease ratio may be preferably in a range of 10 to 90% and more preferably in a range of 20 to 80% with respect to the maximum thickness.

When a product shape is complicated, the chamfer portion is preferably thin, but when a product particularly requires rigid, the chamfer portion is preferably thick.

[Components]

The shaped product of the present disclosure may include other components such as a boss or a rib to be suitable for various purposes of the shaped product in addition to the standing plane (B), the reference plane (S), the auxiliary flow path (C), and the chamfer portion (D). The components such as a boss or a rib may be freely arranged on one side or both sides.

The shaped product of the present disclosure may further include a flange portion at an end of the standing plane (B). In the present disclosure, the flange portion refers to a plane which is combined with the end of the standing plane and has a gradient with respect to the standing plane (B) but is not in contact with the reference plane. The flange portion may be or may not be parallel to the reference plane. By forming the flange portion, the shaped product has a reinforcing effect and warpage of the shaped product can be suppressed.

[Isotropic Property]

Preferably, the shaped product of the present disclosure has a substantially isotropic property. In this case, the substantially isotropic property refers to a case where a tension test based on an arbitrary direction of the shaped product made of the fiber-reinforced composite material and a direction perpendicular thereto is carried out to measure tensile modulus, and a ratio (Eδ) obtained by dividing the higher value by the lower value among values of the measured tensile modulus is 1.3 or lower.

Preferably, the shaped product of the present disclosure has Eδ in a range of 1.0 to 1.3.

[Reinforcing Fibers and Thermoplastic Resin Included in Fiber-Reinforced Composite Material Constituting Shaped Product]

The shaped product of the present disclosure is made of a fiber-reinforced composite material including discontinuous reinforcing fibers having an average fiber length of 5 mm or more and 100 mm or less and a thermoplastic resin, and an amount of the thermoplastic resin in the fiber-reinforced composite material is in a range of preferably 50 to 1000 parts by weight and more preferably 50 to 500 parts by weight based on 100 parts by weight of the reinforcing fibers.

In the shaped product of the present disclosure, at each portion including the standing plane (B), a volume fraction (Vf) of reinforcing fibers may be substantially the same, or carbon fiber content may be changed. The volume fraction of reinforcing fibers may be selected appropriately for a purpose of a required shaped product. However, in consideration of a purpose of fiber reinforcement, preferably, the Vf is substantially the same as the other portions. Specifically, the expression "Vf is substantially the same at each portion" refers to a case where a ratio obtained by dividing a high Vf value by a low Vf value is 1.0 to 1.2.

Preferably, the reinforcing fibers included in the fiber-reinforced composite material constituting the shaped product of the present disclosure may be at least one selected from a group consisting of carbon fibers, aramid fibers, and glass fibers. These materials may be used in combination with each other, and among them, the carbon fibers are preferable in that a light shaped product made of a fiber-reinforced composite material being lightweight and excellent in strength can be provided. In particular, a carbon fiber whose precursor is a polyacrylonitrile-based fiber (hereinafter, simply referred to as "polyacrylonitrile-based carbon fiber" or "PAN-based carbon fiber") is preferable. The carbon fibers have an average fiber diameter of preferably 3 to 12 μm, more preferably 5 to 9 μm, and still more preferably 5 to 7 μm.

The reinforcing fibers included in the fiber-reinforced composite material constituting the shaped product of the present disclosure are discontinuous and have an average fiber length of 5 mm or more and 100 mm or less. Preferably, the fiber length of the reinforcing fibers is 5 mm or more and 80 mm or less, more preferably, the fiber length of the reinforcing fibers is 10 mm or more and 50 mm or less, and still more preferably, the fiber length of the reinforcing fibers is 10 mm or more and 30 mm or less. Further, by employing a preferable method for cutting reinforcing fiber to be described below, a length (average fiber length) of the reinforcing fibers may be fixed.

In molding the shaped product made of the fiber-reinforced composite material, a random mat including reinforcing fibers and a thermoplastic resin may be used as a starting material and may be used through the form of a prepreg. In the shaped product made of the fiber-reinforced composite material, a fiber length of the reinforcing fibers and a ratio between a fiber bundle and single fibers are maintained as those in the random mat.

Examples of the thermoplastic resin included in the fiber-reinforced composite material may include a polyvinyl chloride resin, a polyvinylidene chloride resin, a polyvinyl acetate resin, a polyvinyl alcohol resin, a polystyrene resin, an acrylonitrile-styrene resin (AS resin), an acrylonitrile-butadiene-styrene resin (ABS resin), an acryl resin, a methacryl resin, a polyethylene resin, a polypropylene resin, a polyamide 6 resin, a polyamide 11 resin, a polyamide 12 resin, a polyamide 46 resin, a polyamide 66 resin, a polyamide 610 resin, a polyacetal resin, a polycarbonate resin, a polyethylene terephthalate resin, a polyethylene naphthalate resin, a polybutylene terephthalate resin, a polyarylate resin, a polyphenylene ether rein, a polyphenylene sulfide resin, a polysulfone resin, a polyethersulfone resin, a polyether ether ketone resin, and a polylactic acid resin.

Hereinafter, a method for manufacturing the above-described shaped product will be described.

[Method for Manufacturing Shaped Product]

Preferably, the shaped product of the present disclosure is obtained by directly molding a random mat including reinforcing fibers with an average fiber length of 5 mm or more and 100 mm or less and a thermoplastic resin, wherein a fiber areal weight of the reinforcing fibers is 25 to 10000 g/m$^2$, and a ratio of a reinforcing fiber bundle (A) including the reinforcing fibers of a critical number of single fiber or more, the critical number being defined by the following Formula (1), to the total amount of the reinforcing fibers is 20 Vol % or more and 99 Vol % or less, or by molding a prepreg as an intermediate base material:

$$\text{Critical number of single fiber} = 600/D \quad (1)$$

(wherein D is an average fiber diameter (μm) of single reinforcing fiber).

Preferably, the shaped product of the present disclosure is obtained by performing an impregnation process and a molding process to the above-described random mat through the following steps A-1) to A-3):

A-1) a step of obtaining a prepreg by heating and pressurizing the random mat to a temperature equal to or higher than a melting point and lower than a decomposition temperature when the thermoplastic resin is crystalline and to a temperature equal to or higher than a glass transition temperature and lower than the decomposition temperature when the thermoplastic resin is amorphous to impregnate the thermoplastic resin into the reinforcing fiber bundle;

A-2) a step of arranging the prepreg obtained in step A-1) in a mold whose temperature is adjusted to a temperature lower than the melting point when the thermoplastic resin is crystalline or to a temperature lower than the glass transition temperature when the thermoplastic resin is amorphous, and the mold which has a reference plane (S) and a standing plane (B), after the prepreg obtained in step A-1) is heated to a temperature equal to or higher than the melting point and lower than the decomposition temperature when the thermoplastic resin is crystalline or to a temperature equal to or higher than the glass transition temperature and lower than the decomposition temperature when the thermoplastic resin is amorphous; and A-3) a step of pressurizing and molding the prepreg arranged in the mold in step A-2).

Otherwise, preferably, the shaped product of the present disclosure is obtained by performing an impregnation process and a molding process onto the above-described random mat through the following steps B-1) to B-4):

B-1) a step of arranging the random mat in a mold having a reference plane (S) and a standing plane (B);

B-2) a step of pressurizing the random mat while heating the mold to a temperature equal to or higher than a melting point of the thermoplastic resin and lower than a decomposition temperature when the thermoplastic resin is crystalline or to a temperature equal to or higher than a glass transition temperature and lower than the decomposition temperature when the thermoplastic resin is amorphous (first press step);

B-3) a step of pressurizing the random mat in at least one pressure step so as to allow a pressure of the final pressure step to be 1.2 to 100 times greater than the pressure of the first press step (second press step); and B-4) a step of molding the shaped product by adjusting a temperature of the mold to be lower than the melting point when the thermoplastic resin is crystalline and to be lower than the glass transition temperature when the thermoplastic resin is amorphous.

The method of performing an impregnation process and a molding process through steps A-1) to A-3) is a so-called cold press method. The method of performing an impregnation process and a molding process through steps B-1) to B-4) is a so-called hot press method. Although both of the press molding methods can be applied to the shaped product of the present disclosure, the cold press method is more preferably used in consideration that a molding time can be further reduced.

The above-described steps may be continuously carried out after a process of manufacturing a random mat or may be separately carried out after a random mat is first manufactured.

[Random Mat]

A random mat used for manufacturing the shaped product of the present disclosure includes reinforcing fibers and a thermoplastic resin. The kinds of the reinforcing fibers and the thermoplastic resin used herein are the same as described above with regard to the shaped product. In a plane of the random mat, the reinforcing fibers are not aligned in a specific direction but are dispersed and oriented in random directions.

The random mat is an in-plane isotropic material. When a shaped product is made of the random mat, an isotropic property of the reinforcing fibers in the random mat is also maintained in the shaped product. When a shaped product is made of the random mat and a ratio of tensile modulus in two directions perpendicular to each other is obtained, the isotropic property of the random mat and the shaped product can be quantitatively evaluated. In the present disclosure, when a ratio (Eδ) obtained by dividing the higher value by the lower value among values of the measured tensile modulus is 1.3 or lower, the shaped product is regarded as having a substantially isotropic property. When the ratio (Eδ) is not higher than 1.1, the shaped product is regarded as having an excellent isotropic property.

The reinforcing fibers included in the random mat are discontinuous and have an average fiber length of 5 mm or more and 100 mm or less. The random mat including somewhat long reinforcing fibers shows a reinforcing function. Preferably, a fiber length of the reinforcing fibers is 5 mm or more and 80 mm or less, more preferably, a fiber length of the reinforcing fibers is 10 mm or more and 50 mm or less, and still more preferably, a fiber length of the reinforcing fibers is 10 mm or more and 30 mm or less. Further, by employing a preferable method for cutting reinforcing fiber to be described below, a length of the reinforcing fibers constituting the random mat may be fixed.

Preferably, the reinforcing fibers included in the random mat may be added with a sizing agent, and the sizing agent may be preferably added in an amount of more than 0 to 10 parts by weight based on 100 parts by weight of the reinforcing fibers.

A fiber areal weight of the reinforcing fibers in the random mat is 25 to 10000 $g/m^2$, preferably 25 to 6000 $g/m^2$, and more preferably 25 to 3000 $g/m^2$. When the fiber areal weight is less than 25 $g/m^2$, since distribution of the reinforcing fibers in the random mat is likely to be non-uniform, a sufficient reinforcing effect may not be exhibited. When the fiber areal weight is more than 10000 $g/m^2$, it may be difficult to impregnate the reinforcing fiber with a resin due to excessive amount of the reinforcing fibers, and therefore a void as a flaw in the shaped product tends to be easily formed. Further, since the reinforcing fibers have a greater specific gravity than the thermoplastic resin, the shaped product becomes heavy.

[Opening Degree of Random Mat]

In the random mat used for manufacturing the shaped product of the present disclosure, a ratio of a reinforcing fiber bundle (A) including the reinforcing fibers of a critical number of single fiber or more, the critical number defined by Formula (1), and more accurately, a reinforcing fiber bundle (A) including single fibers of a critical number of single fiber, the critical number being defined by Formula (1), to the total amount of the reinforcing fibers is 20 Vol % or more and 99 Vol % or less, $$\text{Critical number of single fiber} = 600/D \tag{1}$$

(wherein D is an average fiber diameter (μm) of single reinforcing fiber).

In the mat, single fibers of reinforcing fibers or fiber bundles including reinforcing fibers of less than the critical number of single fiber, as reinforcing fibers other than the reinforcing fiber bundle (A), may exist.

That is, preferably, the random mat of the present disclosure includes the reinforcing fiber bundle (A) including the reinforcing fibers of the critical number of single fiber or more in an amount of 20 Vol % or more and 99 Vol % or less. That is, it is preferred that the random mat includes the reinforcing fiber bundle including the reinforcing fibers in a specific number or more by controlling an opening degree of the reinforcing fibers, and other opened reinforcing fibers at a specific ratio When a ratio of the reinforcing fiber bundle (A) to the total amount of the reinforcing fibers is less than 20 Vol %, and also when the random mat is molded, since the random mat is difficult to flow in a mold, it is difficult to fill to an end of a cavity of the mold. Therefore, it becomes difficult to obtain a shaped product having dimensions as designed. When a ratio of the reinforcing fiber bundle (A) is more than 99 Vol %, since entangled parts of the fiber becomes locally thick, it is difficult to obtain a thin-walled shaped product. A ratio of the reinforcing fiber bundle (A) is more preferably 30 Vol % or more to less than 90 Vol %, and still more preferably 30 Vol % or more to less than 80 Vol %.

Preferably, an average number (N) of the fibers in the reinforcing fiber bundle (A) including the reinforcing fibers of the critical number of single fiber or more satisfies Formula (2), $$0.7\times10^4/D^2 < N < 1\times10^5/D^2 \quad (2)$$

(wherein D is an average fiber diameter (μm) of single reinforcing fiber).

Specifically, when an average fiber diameter of the carbon fibers included in the random mat is 5 to 7 μm, a critical number of single fiber is in a range of 86 to 120, and when an average fiber diameter of the carbon fibers is 5 μm, an average number of the fibers in the fiber bundle is in a range of more than 280 to less than 4000, preferably 600 to 2500, and more preferably 600 to 1600. When an average fiber diameter of the carbon fibers is 7 μm, an average number of the fibers in the fiber bundle is in a range of more than 142 to less than 2040, preferably 300 to 1500, and more preferably 300 to 800.

When an average number of the fibers (N) in the reinforcing fiber bundle (A) is equal to or less than $0.7\times10^4/D^2$, it is difficult to obtain a high volume fraction of reinforcing fibers (Vf). Further, when an average number of the fibers (N) in the reinforcing fiber bundle (A) is equal to or more than $1\times10^5/D^2$, a thick portion may be locally formed in composite materials, which may cause a void. When a thin-walled shaped product having a thickness of 1 mm or less is intended to be obtained, use of fibers only simply separated results in a large unevenness in fiber areal weight to fail to obtain good physical properties. Further, when all fibers are opened, it becomes easy to obtain a thinner shaped product. However, entanglement of fibers increases to fail to obtain one having a high volume fraction (Vf) of the reinforcing fibers. With the random mat including both the reinforcing fiber bundle (A) including the reinforcing fibers of the critical number of single fiber or more, the critical number defined by Formula (1), and reinforcing fibers (B) in the form of individual single fibers or thinner fiber bundles including the reinforcing fibers of less than the critical number of single fiber, it is possible to obtain a thin shaped product having an excellent physical property. The random mat of the present disclosure may have various thicknesses and can be used as a prepreg to appropriately manufacture a thin-walled shaped article having a thickness of about 0.2 mm to about 1 mm. By doing this, a random mat suitable for a thickness of a target shaped product can be formed and is useful as a prepreg particularly for a thin-walled shaped article such as a surface layer of a sandwich material. An average number of the fibers in the reinforcing fiber bundle (A) can be controlled through a cutting process and an opening process in a preferable manufacturing method described later.

The random mat may be partially or entirely layered to two or more layers and arranged in a mold. The random mat may be layered at a place in the mold corresponding to a part of a molded part to be thick, but by employing a preferable molding method to be described below, a layered part may be arranged regardless of a part to be thick. The upper limit of the layered number is not particularly set, and the layered number may be selected appropriately for a target shaped product and a thickness of a random mat as a starting material, but actually, the layered number may be 100 or less. The layered random mats may be identical with each other or may be different from each other in, for example, a thickness, a kind of a reinforcing fiber, a length of the reinforcing fiber, and a content of the reinforcing fiber.

[Thermoplastic Resin in Random Mat]

Preferably, in the random mat, a thermoplastic resin may be present in the fibrous or particulate form. Since the reinforcing fibers and the thermoplastic resin in the fibrous or particulate form are mixed, the thermoplastic resin can be easily impregnated during a molding process. Two or more kinds of thermoplastic resins may be used, or thermoplastic resins in the fibrous or particulate form may be used together.

As for a thermoplastic resin in the fibrous form, fineness may be in a range of preferably 100 to 5000 dtex and more preferably 1000 to 2000 dtex. Further, an average fiber length may be in a range of preferably 0.5 to 50 mm and more preferably 1 to 10 mm Examples of a thermoplastic resin in the particulate form may include spherical particles, fragment-shaped particles, or cylindrical particles such as pellets. Preferably, the spherical particles may have a shape of a round or elliptical rotator, or an oval shape. In the case of the spherical particles, an average particle diameter is preferably 0.01 to 1000 μm, more preferably 0.1 to 900 μm, and still more preferably 1 to 800 μm. There is no particular limitation in particle diameter distribution, but a sharp distribution is appropriate to obtain a thinner shaped product. A particle diameter distribution can be regulated through classification and so on.

The fragment-shaped particles may preferably have a cylindrical shape such as pellets, a prismatic shape, and a scale-like shape. In this case, an aspect ratio to some degree is allowable, but a preferable length is equivalent to that of the thermoplastic resin in the form of fiber.

In consideration of mass production, there may be preferably used a method in which a molten thermoplastic resin is added to a mat including the reinforcing fibers, and the reinforcing fibers and the thermoplastic resin are integrated with each other. According to this method, it is possible to easily proceed to a prepreg manufacturing process in which the resin is impregnated into the reinforcing fibers.

The random mat may include additives such as various fibrous or non-fibrous fillers, flame-retardant agents, anti-UV agents, pigments, release agents, softeners, plasticizers, and surfactants, in the range which does not detract from the purpose, in addition to the reinforcing fibers of the present disclosure. In particular, when used for electrical and electronic equipment or automobiles, the random mat requires a high flame retardancy. Accordingly, a flame-retardant agent is preferably contained in the thermoplastic resin. The flame-retardant agent may be employed from known agents in the art and is not particularly limited as long as it can impart the thermoplastic composition of the present disclosure with a flame retardancy. Specifically, examples of the flame-retardant agent may include phosphorus-based flame-retardant agents, nitrogen-based flame-retardant agents, silicone compounds, organic alkaline metal salts, organic alkaline earth metal salts, and bromine-based flame-retardant agents. These flame-retardant agents may be used alone or in combination. An amount of the flame-retardant agent may be in a range of preferably 1 to 40 parts by weight and more preferably 1 to 20 parts by weight based on 100 parts by weight of the resin in consideration of a balance among a physical property, moldability, and flame retardancy.

[Method for Manufacturing Random Mat]

The random mat used in the present disclosure is preferably manufactured through the following processes 1 to 3. Further, when a reinforcing fiber is cut in the following process 1, a width of a strand of the reinforcing fiber may be expanded or the strand may be slit, so that an opening process in the process 2 may not be performed. Further, as described below, in the process 3 (Spray process), a mat-shaped material including the reinforcing fibers may be obtained without using a thermoplastic resin and a molten thermoplastic resin may be added to the mat-shaped material with an extruder, or in the process 3 (Spray process), a random mat added with a thermoplastic resin may be obtained and a molten thermoplastic resin may be further added to the random mat.

Process 1: Process for cutting reinforcing fiber bundles (Cutting process)

Process 2: Process for introducing the cut reinforcing fiber bundles into a tube and opening the reinforcing fiber bundles by blowing thereto (Opening process)

Process 3: Process for spreading the opened reinforcing fibers while suctioning the reinforcing fibers with a thermoplastic resin in the fibrous or particulate form, and spraying the reinforcing fibers and the thermoplastic resin to fix the reinforcing fibers and the thermoplastic resin (Spray process)

[Cutting Process]

Specifically, in the process for cutting reinforcing fibers, the reinforcing fibers are cut by using a cutter. Preferably, the cutter may be a rotary cutter.

In order to obtain a fiber bundle having a desired size, it is preferred that a fiber bundle to be cut with a small strand width is used or a strand width is reduced by cutting the strand in a longitudinal direction. In this case, there may be preferably used a cutter having a blade parallel to a fiber direction in addition to a blade perpendicular to the fiber direction to cut the fiber bundle to a specific fiber length and to, at the same time, slit the fiber bundle in the longitudinal direction.

Preferably, the rotary cutter may be a spiral knife with an angle defined or a yarn separating knife.

[Opening Process]

Specifically, in the opening process, the cut reinforcing fiber bundles are introduced into a tube and air is blown to the reinforcing fiber bundles to perform opening. A degree of opening can be appropriately controlled by a pressure of the air. In the opening process, the reinforcing fiber bundles can be opened more satisfactorily by directly blowing air thereto at a wind velocity of preferably 1 to 1000 m/sec and more preferably 50 to 500 m/sec through compressed air blowing holes. Specifically, holes having a diameter of about 1 mm are made in several places in the tube through which the reinforcing fibers pass, and a pressure of about 0.2 to 0.8 MPa is applied from the outside to directly blow compressed air to the fiber bundle, and therefore the reinforcing fiber bundle can be easily opened.

[Spray Process]

In the spray process, the opened reinforcing fibers are suctioned together with the thermoplastic resin in the fibrous or particulate form while the opened reinforcing fibers are spread, and the reinforcing fibers and the thermoplastic resin are sprayed at the same time. Preferably, the opened reinforcing fibers and the thermoplastic resin in the fibrous or particulate form are sprayed onto a sheet, specifically onto a breathable sheet mounted in a lower portion of an opening machine, preferably at the same time.

In the spray process, the supply amount of the thermoplastic resin is preferably 50 to 1000 parts by weight based on 100 parts by weight of the reinforcing fibers.

In this case, preferably, the reinforcing fibers and the thermoplastic resin in the fibrous or particulate form are sprayed so as to be two-dimensionally oriented. In order to spray the opened reinforcing fibers while two-dimensionally orienting them, a spray method and the following fixing method become important. In the spray method of the reinforcing fibers, it is preferred to use a taper tube such as a circular cone shape. In the tube of a circular cone, air is diffused to decrease a flow rate in the tube, and at this time, rotational force is given to the reinforcing fibers. The reinforcing fibers opened by utilizing this Venturi effect can be preferably spread and sprayed.

In the method for manufacturing the random mat used in the present disclosure, the following fixing process may be included, or the fixing process and the spray process may be carried out at the same time, that is, the fibers may be fixed while being sprayed and deposited. Preferably, the fibers are sprayed on a movable and breathable sheet having a suction mechanism to be deposited in a mat form and then fixed in that state. In this case, preferably, the reinforcing fibers and the thermoplastic resin may be evenly sprayed in the random mat without non-uniformity.

[Fixing Process]

In the fixing process, the sprayed reinforcing fibers and thermoplastic resin are fixed. Air is preferably suctioned from a lower portion of the breathable sheet to fix the fibers. The thermoplastic resin sprayed together with the reinforcing fibers is also fixed while being mixed, by air suction in the case of fibrous form or together with the reinforcing fibers even in the case of particulate form.

The highly two-dimensionally oriented mat can be obtained by suctioning from the lower portion through the breathable sheet. Further, the thermoplastic resin in the particulate or fibrous form can be suctioned using negative pressure generated and can also be easily mixed with the reinforcing fibers by diffusion flux generated in the tube. In the obtained mat, the moving distance of the resin is short in an impregnation process due to the presence of the thermoplastic resin in the vicinity of the reinforcing fibers, so that it is possible to impregnate the resin into the reinforcing fiber in a relatively short period of time. It is also possible to previously set a breathable nonwoven fabric made of the same material as the matrix resin to be used to a fixing part and spray the reinforcing fibers and the particles onto the nonwoven fabric.

By the above-described preferable method for manufacturing the random mat, it is possible to obtain the random mat having two-dimensional orientation and containing few fibers whose long axes are three-dimensionally oriented.

[Molten Resin Adding Process]

For example, preferably, the manufacturing method of the present disclosure may include a method in which by using an extruder, a molten thermoplastic resin is integrated with a mat including reinforcing fibers and obtained by performing the above-described spray process and fixing process without using a thermoplastic resin. This method makes it possible to easily proceed to a prepreg manufacturing process in which the resin is impregnated in the reinforcing fibers, and it is suitable for mass production. Further, a molten thermoplastic resin may be further added to a random mat obtained by performing the above-described spray process and fixing process using a thermoplastic resin.

[Mold Shape]

There is no particular limitation in a mold shape, but preferably, a mold includes a core mold and a cavity mold formed in a shear edge structure. An explanatory diagram of the shear edge structure is provided in FIG. 2. An angle 4 of a shear is not particularly limited but may be preferably in a range of 1 to 5 degrees. A clearance 5 of a shear edge is not particularly limited but may be in a range of preferably 0.01 to 0 2 mm and more preferably 0.02 to 0.1 mm. When the clearance 5 of the shear edge is smaller than 0.01 mm, the core mold and the cavity mold are likely to be in contact with each other and the mold is likely to be damaged during a molding process. When the clearance 5 is greater than 0.2 mm, a large amount of buns may be easily formed (the material is protruded from the mold) during a molding process and also, it may be difficult to manufacture a shaped article having a thickness as designed with high accuracy.

A surface property of the mold may be obtained by grinding according to a surface appearance required for a target shaped product. In order for a shaped product to have a smooth surface property, the mold needs to be preferably polished with #400 or more.

The mold used in the manufacturing method of the present disclosure includes a standing plane (B). The standing plane (B) can be formed at any angle in a range of 45 degrees or more and 90 degrees or less with respect to a reference plane (S). As a gradient value is decreased, a pressure required for a molding process is decreased.

Preferably, a ratio of cavity thicknesses of the reference plane (S) and the standing plane (B) is in a range of 0.2 to 10.

The mold used in the manufacturing method of the present disclosure may further include an auxiliary flow path (C) in addition to the reference plane (S) and the standing plane (B), and the auxiliary flow path (C) may be formed at only one or both of the reference plane (S) and the standing plane (B) of the mold.

The mold used in the manufacturing method of the present disclosure may further include a chamfer portion (D) and may still further include the auxiliary flow path (C) in addition to the reference plane (S) and the standing plane (B). In this case, the chamfer portion (D) refers to a plane surface or a curved surface at the boundary of the reference plane (S) and the standing plane (B).

The mold used in the manufacturing method of the present disclosure may include a flange portion as described above with regard to the shaped product, and more accurately, a plane corresponding to the flange portion.

[Prepreg]

According to the present disclosure, when an impregnation process and a molding process including steps A-1) to A-3) are performed, a prepreg is obtained by impregnating the thermoplastic resin into the reinforcing fiber bundle and the reinforcing fibers due to heating the random mat to a temperature equal to or higher than a melting point and lower than a decomposition temperature when the thermoplastic resin is crystalline or to a temperature equal to or higher than a glass transition temperature and lower than the decomposition temperature when the thermoplastic resin is amorphous, and pressurizing the random mat, and the obtained prepreg is used for molding. A form of the reinforcing fibers in the prepreg is maintained as that in the random mat. That is, the reinforcing fibers in the prepreg maintain the same fiber length, isotropic property, and opening degree as those in the random mat and as described above with regard to the random mat.

The obtained prepreg may be subjected to step A-2) without cooling, or the obtained prepreg may be impregnated and cooled, and heated again to a temperature equal to or higher than the melting point and lower than the decomposition temperature when the thermoplastic resin in the prepreg is crystalline or to a temperature equal to or higher than the glass transition temperature and lower than the decomposition temperature when the thermoplastic resin is amorphous, and then the prepreg may be subjected to step A-2). In the prepreg, the thermoplastic resin infiltrates into the reinforcing fiber bundle and between single reinforcing fibers to be impregnated. The prepreg may have a thickness 1 to 10 times and preferably 1 to 5 times greater than a thickness of a target shaped product. The thickness is not limited, but may be preferably 0.1 mm or more. The upper limit of the thickness is not particularly limited as long as the prepreg can be arranged appropriately for molding in the mold, and actually, it may be about 30 mm.

The prepreg may have a void rate in a range of preferably 0 to 30%, more preferably 0 to 10%, still more preferably 0 to 5%, and most preferably 0 to 3%. The void rate of the prepreg is obtained by examining a cross section of the prepreg with an optical microscope and dividing an area of the void by a cross sectional area of the base material examined. Each prepreg is examined five times, and an average value of an examination result is determined as a void rate.

[Cold Press Method]

Hereinafter, a cold press method for performing an impregnation process and a molding process through steps A-1) to A-3) will be described in detail.

In step A-1), a prepreg is obtained by impregnating the thermoplastic resin into the reinforcing fiber bundle and the single reinforcing fibers due to heating the random mat to a temperature equal to or higher than a melting point and lower than a decomposition temperature when the thermoplastic resin is crystalline or to a temperature equal to or higher than a glass transition temperature and lower than the decomposition temperature when the thermoplastic resin is amorphous, and pressurizing the random mat. The obtained prepreg is used in the next step A-2) while maintaining a temperature at the time of the impregnation or after being cooled and heated again. For example, a temperature of the prepreg can be measured by attaching a K-type thermocouple on a surface of the prepreg and using a measurement device provided outside a heating furnace.

In the next step A-2), the prepreg obtained in step A-1) is arranged in a mold whose temperature is adjusted to a temperature lower than the melting point when the thermoplastic resin is crystalline or to a temperature lower than the glass transition temperature when the thermoplastic resin is amorphous so as to have a charge ratio expressed by Formula (4) in a range of 5 to 100%, preferably 20 to 90%, and more preferably 30 to 90%, after the prepreg obtained in step A-1) is heated to a temperature equal to or higher than the melting point and lower than the decomposition temperature when the thermoplastic resin is crystalline or to a temperature equal to or higher than the glass transition temperature and lower than the decomposition temperature when the thermoplastic resin is amorphous.

$$\text{Charge ratio (\%)} = 100 \times \text{base material area (mm}^2\text{)} / \text{total area (mm}^2\text{) of reference plane } (S), \text{standing plane } (B), \text{ and flange portion} \quad (4)$$

(wherein the base material area refers to a projected area of all the arranged random mat or prepreg in a draft direction.).

In this case, the prepreg layered to 1, or 2 to 100 layers may be arranged in the mold. When the prepregs are layered, the prepregs may be partially or entirely overlapped depending on a target shaped product. In this case, preferably, ends of the prepregs are not in contact with an edge portion of the mold. Furthermore, when the prepregs are layered, the prepregs do not need to have the same shape as long as they are partially or entirely overlapped.

At the time of arranging the prepreg in the mold, when a charge ratio is less than 5%, and also when the prepreg pressurized flows in the mold during a molding process, it is likely to lose heat to the mold and may be solidified before a desired shape is formed.

At the time of arranging the prepreg in the mold, when a charge ratio is more than 100%, it is possible to obtain a shaped product by filling the fibers to an end of the mold. However, when a complicated shape is molded, since the material may be tightened or tensioned during a molding process, it may be difficult to control. Therefore, it may be difficult to obtain a shaped product having a thickness as designed. Moreover, since unnecessary parts may remain at an end of a shaped product, a trimming process through machining may be needed, so that the process is complicated and also material loss is caused.

In step A-2), when the prepreg is arranged in the mold with a charge ratio in a range of 5% or more and 100% or less, it is possible to manufacture a light weight shaped product with high productivity without material loss or a need for trimming while the reinforcing fibers actually maintain a random state (isotropic property) in the plane.

In step A-2), preferably, the prepreg may be arranged at a horizontal part (0 degrees) of the mold or at an inclined part having an angle of 70 degrees or less with respect to the horizontal part. When the prepreg is arranged at the inclined part having an angle of 70 degrees or more with respect to the horizontal part of the mold, since an end of the mold may be brought into contact with the prepreg at the time of mold closing during a molding process, the prepreg may be out of position, or an excessive amount of the prepreg is introduced into a cavity of the mold, so that the molding process may not be normally performed.

In step A-2), at the time of arranging the prepreg in the mold, when the prepreg is arranged to avoid branched portions of a shaped product to be obtained, it is possible to obtain a shaped product having a thickness as designed and less wrinkles or omissions.

A thickness of the prepreg arranged in the mold may be appropriately selected depending on a thickness of a target shaped product. However, when a charge ratio of the prepreg with respect to the mold is 80% or less, preferably, a thickness of the prepreg or layered prepregs is 1.0 mm or more in order to make the prepreg adequately flow during a molding process. When a thickness of the prepreg or layered prepregs is less than 1.0 mm, since the prepreg is likely to lose heat to the mold, the molding process may not be performed sufficiently.

Preferably, a temperature of the mold may be in a range of the melting point −200° C. or more to the melting point −10° C. or less when the thermoplastic resin is crystalline or in a range of the glass transition temperature −200° C. or more to the glass transition temperature −10° C. or less when the thermoplastic resin is amorphous. Accordingly, the shaped product obtained in step A-3) can be cooled to a temperature at which a shape is stabilized, and can be taken out of the mold.

Thereafter, in step A-3), the prepreg arranged in the mold in step A-2) is pressurized and molded. At this time, a pressure is in a range of preferably 0.1 MPa to 100 MPa, more preferably 0.2 MPa to 40 MPa, and still more preferably 0.5 MPa to 20 MPa. A time required to reach a target pressure is preferably 0.01 to 10 seconds.

After reaching the target pressure, the prepreg is pressurized for 5 to 200 seconds to be molded. More preferably, the prepreg is pressurized for 10 to 60 seconds. In the meantime, the molding process is carried out by making the prepreg flow, and at the same time, the shaped product is cooled through heat exchange with the mold until a shape is stabilized. Thereafter, the mold is opened and the shaped product is obtained.

[Hot Press Method]

Hereinafter, a hot press method for performing an impregnation process and a molding process through steps B-1) to B-4) will be described in detail.

In step B-1), the random mat is arranged in the mold so as to have a charge ratio expressed by Formula (4) in a range of 5 to 100. The random mat of one layer or 2 to 100 layers overlapped may be arranged in the mold. In this case, the random mat may be used after being heated and/or pressurized and reduced in capacity. When overlapped, the random mats may be partially or entirely overlapped depending on a target shaped product. In this case, preferably, ends of the random mats are not in contact with an edge portion of the mold. In addition, when overlapped, the random mats do not need to have the same shape as long as they are partially or entirely overlapped. The reason for setting the range of the charge ratio and the problem occurring when the charge ratio is out of the range are the same as described above with regard to the prepreg in step A-2) of the cold press method.

In step B-1), preferably, the random mat may be arranged at a horizontal part (0 degrees) of the mold or at an inclined part having an angle of 70 degrees or less with respect to the horizontal part. The problem occurring when the random mat is arranged at the inclined part having an angle of 70 degrees or more with respect to the horizontal part of the mold is the same as described above with regard to the prepreg in step A-2) of the cold press method.

In step B-1), as described above with regard to the arrangement of the prepreg in step A-2) of the cold press method, at the time of arranging the random mat as a base material in the mold, when the base material is arranged to avoid branched portions of a shaped product to be obtained, it is possible to obtain a shaped product having a thickness as designed and less wrinkles or omissions.

In step B-2), the mold is pressurized while being heated to a temperature equal to or higher than a melting point of the thermoplastic resin and lower than a decomposition temperature of the thermoplastic resin when the thermoplastic resin included in the random mat is crystalline or to a temperature equal to or higher than a glass transition temperature of the thermoplastic resin and lower than the decomposition temperature of the thermoplastic resin when the thermoplastic resin is amorphous, and thereby the thermoplastic resin is impregnated into the reinforcing fiber bundle and between the single reinforcing fibers (a first press step).

In step B-3), a pressurizing process is carried out in at least one pressure step so as to a pressure of a final pressure step to be 1.2 to 100 times greater than the pressure of the first press step (a second press step).

In the first press step, the random mat is pressurized to a certain pressure level for preferably 0.5 to 20 minutes and heated to a temperature equal to or higher than a melting point of the thermoplastic resin and lower than a decomposition temperature of the thermoplastic resin when the thermoplastic resin included in the random mat is crystalline and to a temperature equal to or higher than a glass transition temperature of the thermoplastic resin and lower than the decomposition temperature of the thermoplastic resin when the thermoplastic resin is amorphous, and thereby the thermoplastic resin is impregnated into the reinforcing fiber bundle and between the single reinforcing fibers. Subsequently, a time required to shift to the second press step may be appropriately selected depending on performance of the molding machine and may be preferably in a range of 0.01 to 200 seconds to reduce a time for molding.

In the second press step, one pressure step or a plurality of pressure steps are applied, and preferably, it may be applied in one pressure step for simplification of a molding process. A temperature of the mold in the second press step may be equal to the temperature of the mold in the first press step, or may be increased to a temperature in a range of the mold temperature $+1°$ C. to less than the decomposition temperature. When the second press step is carried out in multiple pressure steps, heating or cooling may be carried out after a second pressure step, or heating and cooling may be carried out alternately.

A total time for pressing in the second press step is not particularly limited, but may be preferably in a range of 0.5 to 10 minutes to reduce a time for molding.

A target pressure of the first press step is in a range of 0.1 MPa to 10 MPa and preferably 0.2 MPa to 8 MPa. A final target pressure of the second press step may be appropriately selected depending on performance of the molding machine and may be in a range of preferably 0.2 to 100 MPa, more preferably 0.3 to 50 MPa, and still more preferably 0.5 to 20 MPa. The final target pressure of the second press step is 1.2 to 100 times higher than the target pressure of the first press step. That is, preferably, a molding pressure in steps B-2) and B-3) is in a range of 0.1 MPa to 100 MPa. When a molding pressure in steps B-2) and B-3) is extremely low, the impregnation process and the molding process may be carried out insufficiently. Further, in order to increase a molding pressure, a molding machine having a bigger size and higher performance is needed. Therefore, unnecessarily high molding pressure is not preferred in terms of investment in equipment and productivity.

In step B-4), the molding process is carried out by adjusting a temperature of the mold to be lower than the melting point when the thermoplastic resin included in the random mat is crystalline and to be lower than the glass transition temperature when the thermoplastic resin is amorphous. Preferably, a temperature of the mold after the adjustment may be in a range of the melting point $-200°$ C. or more to the melting point $-10°$ C. or less when the thermoplastic resin is crystalline or in a range of the glass transition temperature $-200°$ C. or more to the glass transition temperature $-10°$ C. or less when the thermoplastic resin is amorphous. A time required to perform this step can be appropriately controlled depending on a cooling condition, but may be preferably in a range of 0.5 to 20 minutes to reduce a time for molding. A method for adjusting a temperature of the mold is not particularly limited. Accordingly, the mold may be appropriately cooled by installing a pipe for adjusting a temperature in the mold and discharging a medium for cooling into the pipe.

EXAMPLES

Examples will be provided below, but the present disclosure is not limited thereto. An evaluation method used in Examples will be described below. Furthermore, unless particularly stated, regarding a reinforcing fiber bundle (A) or a sample thereof, a unit of a length of the fiber bundle (fiber length) is mm and a unit of a weight is g. Furthermore, a measurement and evaluation method of a random mat to be described below can be applied to a mat-shaped material (which may be simply referred to as "reinforcing fiber mat" hereinafter) that is constituted by reinforcing fibers without containing a thermoplastic resin.

1) Analysis of Reinforcing Fiber Bundle (A) in Random Mat.

A sample of about 10 mm×10 mm to about 100 mm×100 mm is cut out of a random mat. From the cut sample, fiber bundles are all taken out with tweezers. With all the fiber bundles, a length (Li) and a weight (Wi) of each fiber bundle are measured and recorded. Fiber bundles which are too small to be taken out with the tweezers are collected together, and a weight (Wk) thereof is measured. To measure a weight, a balance which is capable of measuring down to 1 mg is used. When the fibers can be separated from a resin, only the fibers are taken out with the tweezers. When it is difficult to separate the reinforcing fibers from the resin, after heating, for example, at 500° C. for about 1 hour to remove the resin, the above-described operation is carried out. From a fiber diameter (D) of the reinforcing fibers used in the random mat, a critical number of single fiber is calculated, and the reinforcing fibers are divided into the reinforcing fiber bundles (A) including the reinforcing fiber of the critical number of single fiber and the others. Further, in the case where two or more kinds of reinforcing fibers are used, division is performed for each kind of fibers, and the measurement and the evaluation are performed for each.

A method for calculating an average number of the fibers (N) in the reinforcing fiber bundles (A) is as follows.

A fiber number (Ni) in each reinforcing fiber bundle is determined from a fineness (F) (g/m) of the reinforcing fibers used by the following formula.

$$Ni=Wi/(Li\times F)$$

The average number of the fibers (N) in the reinforcing fiber bundles (A) is determined from the number of bundles (I) of the reinforcing fiber bundles (A) by the following formula.

$$N=\Sigma Ni/I$$

A ratio (VR) of the reinforcing fiber bundles (A) to the total amount of the reinforcing fibers in the random mat is determined using a density ($\rho$) (g/cm$^3$) of the reinforcing fibers by the following formula.

$$VR=\Sigma(Wi/\rho)\times 100/((Wk+\Sigma Wi)/\rho)$$

2) Analysis of Reinforcing Fiber Bundle (A) in Fiber-Reinforced Composite Material Regarding a reinforcing fiber bundle in a fiber-reinforced composite material of a shaped product, after a resin is removed from a furnace at 500° C. for about 1 hour, a measurement is carried out in the same manner as the measurement method of the random mat.

3) Measurement of Average Fiber Length of Reinforcing Fiber Contained in Random Mat or Fiber-Reinforced Composite Material Lengths of 100 reinforcing fibers randomly extracted from a random mat or a fiber-reinforced composite material are measured down to the millimeter with a caliper and a loupe and recorded. From the lengths (Li) of all reinforcing fibers measured, an average fiber length (La) is determined by the following formula. In the case of the composite material, after a resin is removed in a furnace at 500° C. for about 1 hour, the reinforcing fibers are extracted.

$$La = \Sigma Li/100$$

4) Evaluation of Content of Reinforcing Fiber and Resin, and Volume Fraction of Reinforcing Fibers (Vf) in Fiber-Reinforced Composite Material With a fiber-reinforced composite material of a shaped product, by burning and removing a resin from a furnace at 500° C. for about 1 hour and measuring a weight of a sample before and after the treatment, weights of the reinforcing fibers and the resin were obtained and wt. % of each component was calculated. Furthermore, from the obtained weights and specific gravity, a volume fraction of reinforcing fibers (Vf) was calculated.

5) Appearance of Shaped Product

An appearance of a shaped product was evaluated through a visual inspection, with an optical microscope, and by touch. In terms of a place where a resin is insufficiently (dry) impregnated into reinforcing fibers, a wrinkle, and a crack, the evaluation was made according to the following evaluation criteria.

Good: Any particular abnormality is not observed in appearance.

Bad: A slightly dry place or a wrinkle is observed.

Very bad: Many dry places or wrinkles are observed, or cracks are confirmed.

6) Warpage of Shaped Product

In terms of warpage of a shaped product, the shaped product was evaluated through a visual inspection and by touch according to the following evaluation criteria.

Good: Any warpage is not observed.

Bad: Slight warpage is confirmed.

Very bad: Severe warpage occurs.

7) Moldability

In terms of moldability, an evaluation was made through observation in a shape of a shaped product according to the following evaluation criteria.

Good: A fiber-reinforced composite material is filled to an end, and any defect is not observed.

Bad: Some defects are partially observed.

Very bad: Many defects are observed.

8) Evaluation of Isotropic Property (Fiber Orientation) of Fiber-Reinforced Composite Material To evaluate an isotropic property of a fiber-reinforced composite material constituting a shaped product, a tensile test specimen based on an arbitrary direction of the fiber-reinforced composite material and a direction perpendicular thereto was cut out by using water-jet and a tensile test was carried out. Between tensile modulus values of the both directions, a ratio (Eδ) obtained by dividing the higher value by the lower value was calculated. As Eδ is closer to 1, an isotropic property is excellent.

9) Void Rate of Prepreg

A void rate of a prepreg was calculated by examining a cross section of the sample with an optical microscope and dividing an area of the void by a cross sectional area of the sample examined. Each sample was examined five times, and an average value of an examination result was determined as a void rate.

<Manufacturing Of Random Mat>

Manufacturing Example 1

Carbon fibers, "Tenax" (registered trade mark) STS40-24KS (average fiber diameter: 7 μm, strand width: 10 mm, tensile strength: 4000 MPa) manufactured by Toho Tenax Co., Ltd. was used as reinforcing fibers. The carbon fibers were widened in width while being cut to a length of 20 mm, and introduced into a taper tube at a supply amount of 1250 g/min, and while air was blown to the carbon fibers in the taper tube at a wind velocity of 800 msec to partially open the fiber bundle, the carbon fibers were sprayed onto a table movable in XY directions provided under an outlet of the taper tube with suctioning from a lower portion of the table with a blower.

A polyamide 6 resin (A1030, melting point: 225° C., decomposition temperature: 300° C. (in the atmosphere), manufactured by Unitika Ltd.) was supplied as a matrix resin into the taper tube at a rate of 1500 g/min, and sprayed together with the carbon fibers. Accordingly, a random mat in which the carbon fibers having an average fiber length of 20 mm and the polyamide 6 resin were mixed was obtained.

A fiber areal weight of the reinforcing fibers in the obtained random mat was 1540 g/m². Further, according to a result of measuring a ratio of a reinforcing fiber bundle (A) in the obtained random mat and an average number of the fibers (N), a critical number of single fiber defined by Formula (1) was 86, a ratio of the reinforcing fiber bundle (A) to the total amount of the reinforcing fibers in the random mat was 35 Vol %, and an average number of the fibers (N) in the reinforcing fiber bundle (A) was 240. The conditions for manufacturing the random mat and the measurement result are shown in Table 1.

Manufacturing Example 2

A random mat in which the carbon fibers having an average fiber length of 20 mm and the polyamide 6 resin were mixed was obtained by performing an operation in the same conditions as in Manufacturing Example 1 except that a supply amount of the carbon fibers into the taper tube was 2000 g/min, a supply amount of the polyamide 6 resin was 2400 g/min, and a wind velocity of air blown to the carbon fibers was 200 m/sec.

A fiber areal weight of the reinforcing fibers in the obtained random mat was 2460 g/m². Moreover, a critical number of single fiber of the obtained random mat as defined by Formula (1) was 86, a ratio of the reinforcing fiber bundle (A) to the total amount of the reinforcing fibers in the random mat was 95 Vol %, and an average number of the fibers (N) in the reinforcing fiber bundle (A) was 1200. The conditions for manufacturing the random mat and the measurement result are shown in Table 1.

Manufacturing Example 3

A random mat in which the carbon fibers having an average fiber length of 20 mm and the polyamide 6 resin were mixed was obtained by performing an operation in the same conditions as in Manufacturing Example 1 except that a supply amount of the carbon fibers into the taper tube was 750 g/min, a supply amount of the polyamide 6 resin was 900 g/min, and a wind velocity of air blown to the carbon fibers was 650 m/sec.

A fiber areal weight of the reinforcing fibers in the obtained random mat was 924 g/m². Further, a critical number of single fiber of the obtained random mat as defined by Formula (1) was 86, a ratio of the reinforcing fiber bundle (A) to the total amount of the reinforcing fibers in the random mat was 35 Vol %, and an average number of the fibers (N) in the reinforcing fiber bundle (A) was 240. The conditions for manufacturing the random mat and the measurement result are shown in Table 1.

Manufacturing Example 4

A random mat in which the carbon fibers having an average fiber length of 20 mm and the polyamide 6 resin were mixed was obtained by performing an operation in the same conditions as in Manufacturing Example 1 except that a supply amount of the carbon fibers into the taper tube was 300 g/min, a supply amount of the polyamide 6 resin was 360 g/min, and a wind velocity of air blown to the carbon fibers was 450 m/sec.

A fiber areal weight of the reinforcing fibers in the obtained random mat was 370 g/m². Furthermore, a critical number of single fiber of the obtained random mat as defined by Formula (1) was 86, a ratio of the reinforcing fiber bundle (A) to the total amount of the reinforcing fibers in the random mat was 35 Vol %, and an average number of the fibers (N) in the reinforcing fiber bundle (A) was 240. The conditions for manufacturing the random mat and the measurement result are shown in Table 1.

Manufacturing Example 5

A random mat in which the carbon fibers having an average fiber length of 10 mm and the polyamide 6 resin were mixed was obtained by performing an operation in the same conditions as in Manufacturing Example 4 except that the carbon fibers were cut to a length of 10 mm and a wind velocity of air blown to the carbon fibers was 430 m/sec.

A fiber areal weight of the reinforcing fibers in the obtained random mat was 370 g/m². Further, a critical number of single fiber of the obtained random mat as defined by Formula (1) was 86, a ratio of the reinforcing fiber bundle (A) to the total amount of the reinforcing fibers in the random mat was 35 Vol %, and an average number of the fibers (N) in the reinforcing fiber bundle (A) was 240. The conditions for manufacturing the random mat and the measurement result are shown in Table 1.

Manufacturing Example 6

A random mat in which the carbon fibers having an average fiber length of 50 mm and the polyamide 6 resin were mixed was obtained by performing an operation in the same conditions as in Manufacturing Example 4 except that the carbon fibers were cut to a length of 50 mm and a wind velocity of air blown to the carbon fibers was 500 m/sec.

A fiber areal weight of the reinforcing fibers in the obtained random mat was 370 g/m². Furthermore, a critical number of single fiber of the obtained random mat as defined by Formula (1) was 86, a ratio of the reinforcing fiber bundle (A) to the total amount of the reinforcing fibers in the random mat was 35 Vol %, and an average number of the fibers (N) in the reinforcing fiber bundle (A) was 240. The conditions for manufacturing the random mat and the measurement result are shown in Table 1.

Manufacturing Example 7

A random mat in which carbon fibers having an average fiber length of 20 mm and the polyamide 6 resin were mixed was obtained by performing an operation in the same conditions as in Manufacturing Example 4 except that Tenax IMS60-12K (average fiber diameter: 5 µm, strand width: 6 mm) manufactured by Toho Tenax Co., Ltd. was used as the carbon fibers and a wind velocity of air blown to the carbon fibers was 500 msec.

A fiber areal weight of the reinforcing fibers in the obtained random mat was 370 g/m². In addition, a critical number of single fiber of the obtained random mat as defined by Formula (1) was 120, a ratio of the reinforcing fiber bundle (A) to the total amount of the reinforcing fibers in the random mat was 35 Vol %, and an average number of the fibers (N) in the reinforcing fiber bundle (A) was 240. The conditions for manufacturing the random mat and the measurement result were as represented in Table 1.

Manufacturing Example 8

A random mat in which the carbon fibers having an average fiber length of 20 mm and a polypropylene resin were mixed was obtained by performing an operation in the same conditions as in Manufacturing Example 1 except that a polypropylene resin (Prime polypro J108M, melting point: 170° C., decomposition temperature: about 300° C. (in the atmosphere), manufactured by Prime Polymer Co., Ltd.) freeze-pulverized into an average particle diameter of about 1 mm was used as the matrix resin and supplied into the taper tube at a supply amount of 1200 g/min A fiber areal weight of the reinforcing fibers in the obtained random mat was 1540 g/m². Moreover, a critical number of single fiber of the obtained random mat as defined by Formula (1) was 86, a ratio of the reinforcing fiber bundle (A) to the total amount of the reinforcing fibers in the random mat was 35 Vol %, and an average number of the fibers (N) in the reinforcing fiber bundle (A) was 240. The conditions for manufacturing the random mat and the measurement result are shown in Table 1.

Manufacturing Example 9

A random mat in which the carbon fibers having an average fiber length of 20 mm and a polycarbonate resin were mixed was obtained by performing an operation in the same conditions as in Manufacturing Example 1 except that a polycarbonate resin (Panlite L-1225L, glass transition temperature: 145 to 150° C., decomposition temperature: 350° C. (in the atmosphere), manufactured by Teijinkasei Co., Ltd.) freeze-pulverized into an average particle diameter of about 1 mm was used as the matrix resin and supplied into the taper tube at a supply amount of 1580 g/min, and a wind velocity of air blown to the carbon fibers was 400 m/sec.

A fiber areal weight of the reinforcing fibers in the obtained random mat was 1540 g/m². Further, a critical number of single fiber of the obtained random mat as defined by Formula (1) was 86, a ratio of the reinforcing fiber bundle (A) to the total amount of the reinforcing fibers in the random mat was 80 Vol %, and an average number of the fibers (N) in the reinforcing fiber bundle (A) was 1000. The conditions for manufacturing the random mat and the measurement result are shown in Table 1.

Manufacturing Example 10

A random mat in which the carbon fibers having an average fiber length of 20 mm and a polybutylene terephthalate resin were mixed was obtained by performing an operation in the same conditions as in Manufacturing Example 1 except that a polybutylene terephthalate resin (Duranex 700FP, melting point: 230° C., decomposition temperature: 300° C. (in the atmosphere), manufactured by Polyplastics Co., Ltd.) freeze-pulverized into an average particle diameter of about 1 mm was used as the matrix resin and supplied into the taper tube at a supply amount of 1730 g/min, and a wind velocity of air blown to the carbon fibers was 700 m/sec.

A fiber areal weight of the reinforcing fibers in the obtained random mat was 1540 g/m². Furthermore, a critical number of single fiber of the obtained random mat as defined by Formula (1) was 86, a ratio of the reinforcing fiber bundle (A) to the total amount of the reinforcing fibers in the random mat was 50 Vol %, and an average number of the fibers (N) in the reinforcing fiber bundle (A) was 500. The conditions for manufacturing the random mat and the measurement result were as represented in Table 1.

Manufacturing Example 11

A random mat in which glass fibers having an average fiber length of 20 mm and the polyamide 6 resin were mixed was obtained by performing an operation in the same conditions as in Manufacturing Example 1 except that glass fibers, EX-2500 (average fiber diameter: 15 μm, strand width: 9 mm) manufactured by Nippon Electric Glass Co., Ltd. was used as the reinforcing fibers and a wind velocity of air blown to the glass fibers was 600 m/sec.

A fiber areal weight of the reinforcing fibers in the obtained random mat was 1540 g/m². Further, a critical number of single fiber of the obtained random mat as defined by Formula (1) was 40, a ratio of the reinforcing fiber bundle (A) to the total amount of the reinforcing fibers in the random mat was 80 Vol %, and an average number of the fibers (N) in the reinforcing fiber bundle (A) was 150. The conditions for manufacturing the random mat and the measurement result are shown in Table 1.

Manufacturing Example 12

Carbon fibers, "Tenax" (registered trade mark) STS40-24KS (average fiber diameter: 7 μm, strand width: 10 mm) manufactured by Toho Tenax Co., Ltd. was used as the reinforcing fibers. The carbon fibers were slit to a width of 2 mm or less by using a longitudinal slit device and then cut to a fiber length of 20 mm with a rotary cutter capable of continuously cutting the reinforcing fibers. Strands passing through the rotary cutter were introduced into a taper tube and blown at a wind velocity of 800 m/sec to partially open the fiber bundle. Thereafter, the carbon fibers were sprayed onto a table movable in XY directions provided under an outlet of the taper tube with suctioning from a lower portion of the table with a blower, thereby manufacturing a reinforcing fiber mat.

A molten matrix resin was supplied to the obtained reinforcing fiber mat. A polyamide 6 resin, A1030, manufactured by Unitika Ltd. was used as the matrix resin and melted by an extruder and then supplied from a T-die to the entire surface of the random mat. At this time, portions on the mat to be supplied with the resin were heated with an infrared heater to prevent the resin from being cooled and solidified. The apparatus was operated at a supply amount of the reinforcing fibers of 1250 g/min and a supply amount of the polyamide 6 resin of 1500 g/min, and a random mat including the carbon fibers and the polyamide 6 resin was formed.

A fiber areal weight of the reinforcing fibers in the obtained random mat was 1540 g/m². Further, according to a result of measuring a ratio of a reinforcing fiber bundle (A) in the random mat and an average number of the fibers (N), a critical number of single fiber of the obtained random mat as defined by Formula (1) was 86, a ratio of the reinforcing fiber bundle (A) to the total amount of the reinforcing fibers in the random mat was 35 Vol %, and an average number of the fibers (N) in the reinforcing fiber bundle (A) was 240. The conditions for manufacturing the random mat and the measurement result are shown in Table 1.

Manufacturing Example 13

A random mat in which the carbon fibers having an average fiber length of 20 mm and the polyamide 6 resin were mixed was obtained by performing an operation in the same conditions as in Manufacturing Example 1 except that a supply amount of the polyamide 6 resin into the taper tube was 3210 g/min A fiber areal weight of the reinforcing fibers in the obtained random mat was 1540 g/m². Furthermore, a critical number of single fiber of the obtained random mat as defined by Formula (1) was 86, a ratio of the reinforcing fiber bundle (A) to the total amount of the reinforcing fibers in the random mat was 35 Vol %, and an average number of the fibers (N) in the reinforcing fiber bundle (A) was 240. The conditions for manufacturing the random mat and the measurement result are shown in Table 1.

Manufacturing Example 14

A random mat in which the carbon fibers having an average fiber length of 20 mm and the polyamide 6 resin were mixed was obtained by performing an operation in the same conditions as in Manufacturing Example 1 except that a supply amount of the polyamide 6 resin into the taper tube was 980 g/min.

A fiber areal weight of the reinforcing fibers in the obtained random mat was 1540 g/m². Moreover, a critical number of single fiber of the obtained random mat as defined by Formula (1) was 86, a ratio of the reinforcing fiber bundle (A) to the total amount of the reinforcing fibers in the random mat was 35 Vol %, and an average number of the fibers (N) in the reinforcing fiber bundle (A) was 240. The conditions for manufacturing the random mat and the measurement result are shown in Table 1.

Manufacturing Example 15

A random mat in which the carbon fibers having an average fiber length of 20 mm and the polyamide 6 resin were mixed was obtained by performing an operation in the same conditions as in Manufacturing Example 1 except that air was not blown to the carbon fibers.

A fiber areal weight of the reinforcing fibers in the obtained random mat was 1540 g/m². Further, a critical number of single fiber of the obtained random mat as defined by Formula (1) was 86, a ratio of the reinforcing fiber bundle (A) to the total amount of the reinforcing fibers in the random mat was 100 Vol %, and an average number of the fibers (N) in the reinforcing fiber bundle (A) was 24000. The conditions for manufacturing the random mat and the measurement result are shown in Table 1.

Manufacturing Example 16

A random mat in which the carbon fibers having an average fiber length of 20 mm and the polyamide 6 resin were mixed was obtained by performing an operation in the same conditions as in Manufacturing Example 3 except that air was not blown to the carbon fibers.

A fiber areal weight of the reinforcing fibers in the obtained random mat was 924 g/m². In addition, a critical number of single fiber of the obtained random mat as defined by Formula (1) was 86, a ratio of the reinforcing fiber bundle (A) to the total amount of the reinforcing fibers in the random mat was 100 Vol %, and an average number of the fibers (N) in the reinforcing fiber bundle (A) was 24000. The conditions for manufacturing the random mat and the measurement result are shown in Table 1.

Manufacturing Example 17

A random mat in which the carbon fibers having an average fiber length of 20 mm and the polyamide 6 resin were mixed was obtained by performing an operation in the same conditions as in Manufacturing Example 4 except that air was not blown to the carbon fibers.

A fiber areal weight of the reinforcing fibers in the obtained random mat was 370 g/m². Furthermore, a critical number of single fiber of the obtained random mat as defined by Formula (1) was 86, a ratio of the reinforcing fiber bundle (A) to the total amount of the reinforcing fibers in the random mat was 100 Vol %, and an average number of the fibers (N) in the reinforcing fiber bundle (A) was 24000. The conditions for manufacturing the random mat and the measurement result are shown in Table 1.

Manufacturing Example 18

A random mat in which the carbon fibers having an average fiber length of 20 mm and the polyamide 6 resin were mixed was obtained by performing an operation in the same conditions as in Manufacturing Example 1 except that a supply amount of the carbon fibers into the taper tube was 12160 g/min, a supply amount of the polyamide 6 resin was 14600 g/min, and a wind velocity of air blown to the carbon fibers was 300 m/sec.

A fiber areal weight of the reinforcing fibers in the obtained random mat was 15000 g/m². Further, a critical number of single fiber of the obtained random mat as defined by Formula (1) was 86, a ratio of the reinforcing fiber bundle (A) to the total amount of the reinforcing fibers in the random mat was 95 Vol %, and an average number of the fibers (N) in the reinforcing fiber bundle (A) was 1200. The conditions for manufacturing the random mat and the measurement result are shown in Table 1.

When this random mat was manufactured, clogging was likely to occur in the equipment and it was difficult to stably manufacture the random mat.

Manufacturing Example 19

A random mat in which the carbon fibers having an average fiber length of 20 mm and the polyamide 6 resin were mixed was obtained by performing an operation in the same conditions as in Manufacturing Example 1 except that a supply amount of the carbon fibers into the taper tube was 19 g/min, a supply amount of the polyamide 6 resin was 23 g/min, and a wind velocity of air blown to the carbon fibers was 50 m/sec.

A fiber areal weight of the reinforcing fibers in the obtained random mat was 23 g/m². Furthermore, a critical number of single fiber of the obtained random mat as defined by Formula (1) was 86, a ratio of the reinforcing fiber bundle (A) to the total amount of the reinforcing fibers in the random mat was 50 Vol %, and an average number of the fibers (N) in the reinforcing fiber bundle (A) was 500. The conditions for manufacturing the random mat and the measurement result are shown in Table 1.

The obtained random mat had a non-uniform distribution of the reinforcing fibers.

Manufacturing Example 20

A random mat in which the carbon fibers having an average fiber length of 2 mm and the polyamide 6 resin were mixed was obtained by performing an operation in the same conditions as in Manufacturing Example 1 except that the carbon fibers were cut to a length of 2 mm and a wind velocity of air blown to the carbon fibers was 450 m/sec.

A fiber areal weight of the reinforcing fibers in the obtained random mat was 1540 g/m². Moreover, a critical number of single fiber of the obtained random mat as defined by Formula (1) was 86, a ratio of the reinforcing fiber bundle (A) to the total amount of the reinforcing fibers in the random mat was 25 Vol %, and an average number of the fibers (N) in the reinforcing fiber bundle (A) was 200. The conditions for manufacturing the random mat and the measurement result are shown in Table 1.

Manufacturing Example 21

A random mat in which the carbon fibers having an average fiber length of 200 mm and the polyamide 6 resin were mixed was obtained by performing an operation in the same conditions as in Manufacturing Example 1 except that the carbon fibers were cut to a length of 200 mm and a wind velocity of air blown to the carbon fibers was 1000 m/sec.

A fiber areal weight of the reinforcing fibers in the obtained random mat was 1540 g/m². Further, a critical number of single fiber of the obtained random mat as defined by Formula (1) was 86, a ratio of the reinforcing fiber bundle (A) to the total amount of the reinforcing fibers in the random mat was 90 Vol %, and an average number of the fibers (N) in the reinforcing fiber bundle (A) was 800. The conditions for manufacturing the random mat and the measurement result are shown in Table 1.

When this random mat was manufactured, clogging was likely to occur in the equipment and it was difficult to stably manufacture the random mat.

Manufacturing Example 22

A random mat in which the carbon fibers having an average fiber length of 20 mm and the polyamide 6 resin were mixed was obtained by performing an operation in the same conditions as in Manufacturing Example 1 except that a wind velocity of air blown to the carbon fibers was 2000 m/sec.

A fiber areal weight of the reinforcing fibers in the obtained random mat was 1540 g/m². Furthermore, a critical number of single fiber of the obtained random mat as defined by Formula (1) was 86, a ratio of the reinforcing fiber bundle (A) to the total amount of the reinforcing fibers in the random mat was 10 Vol %, and an average number of the fibers (N) in the reinforcing fiber bundle (A) was 100. The conditions for manufacturing the random mat and the measurement result are shown in Table 1.

<Impregnation to Molding>

Example 1

Figure 2:
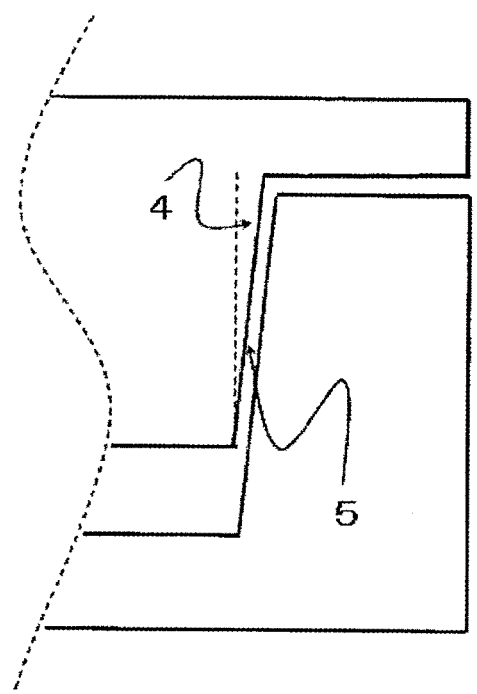
FIG. 2 is a cross-sectional view of a mold (in a combination of a core mold and a cavity mold) illustrating an example of a shear edge structure of the mold.
Figure 3:
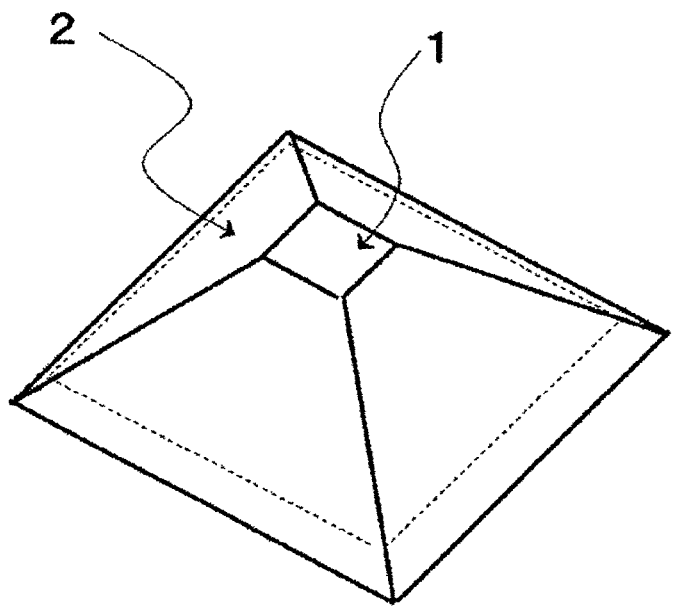
FIG. 3 is a schematic diagram illustrating arrangement of a base material and a mold (of a core mold) of Example 1.
Figure 4:
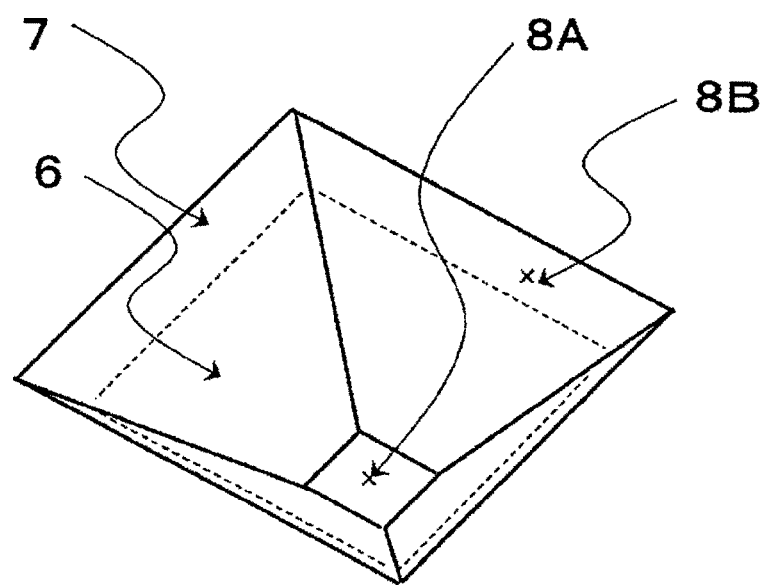
FIG. 4 is a schematic diagram of a shaped product obtained through Example 1.

The random mat obtained in Manufacturing Example 1 was heated up to 250° C. and then pressurized at a pressure of 3 MPa for 7 minutes. Subsequently, the random mat was cooled down to 80° C., so that a plate-shaped prepreg having a thickness of 2.5 mm was obtained. A void rate of the prepreg was 0.1%. Thereafter, the prepreg cut to have a charge ratio of 80% was put into an infrared heater and heated at 255° C. The heated prepreg was arranged in a mold whose temperature was adjusted to 130° C. and which included a standing plane (B) 2 inclined at an angle of 85 degrees with respect to a reference plane (S) 1 (FIG. 3), and then press-molded at a pressure of 10 MPa for 30 seconds, so that a shaped product including a reference plane (S) and a standing plane (B) each having a thickness of 2.0 mm was obtained. FIG. 2 illustrates a schematic diagram of a shear edge portion of the mold used herein. An angle of the shear of the mold was 2 degrees and a clearance of the shear edge was 0.1 mm An angle between the reference plane (S) 1' and the standing plane (B) 2' of the obtained shaped product was 85 degrees, and an area ratio of the standing plane (B) to the reference plane (S) was 35. The material was filled to an end of the obtained shaped product, and any abnormality such as cracks was not observed (Moldability: Good). Moreover, there was no wrinkle on the surface and an appearance of the shaped product was good (Appearance: Good). Any warpage was not observed (Warpage: Good). FIG. 4 illustrates a schematic diagram of the obtained shaped product. The part inside the broken line is a charge part 6 of the prepreg, and the part outside the broken line is a part 7 of the prepreg (fluidizing part 7) fluidized by applying a pressure. According to a result of measuring volume fraction of reinforcing fibers (Vf) of the charging part 6 and the fluidizing part 7, a volume fraction of reinforcing fibers (Vf) of the charging part 6 at a measurement point 8A was 34.6%, and a volume fraction of reinforcing fibers (Vf) of the fluidizing part 7 at a measurement point 8B was 35.0%. Accordingly, those parts showed the values equivalent to each other. Furthermore, a tensile test was carried out in two directions perpendicular to each other with respect to the measurement point 8A and the measurement point 8B. As a result thereof, a ratio (Eδ) of tensile modulus measured in two directions perpendicular to each other was 1.09 at the measurement point 8A and 1.08 at the measurement point 8B, which confirmed that each part had an isotropic property. By doing this, the charging part and the fluidizing part of the shaped product had Vf values or Eδ values equivalent to each other, which means that reinforcing fibers were scarcely oriented in a flow direction of a molten resin, and thus an isotropic property of a random mat or a prepreg was maintained at each part of the shaped product.

A result of the operation in the present Example is shown in Table 2.

Example 2

A plate-shaped prepreg having a thickness of 4.0 mm was obtained by using the random mat obtained in Manufacturing Example 2 and preforming an operation in the same manner as in Example 1. A void rate of the prepreg was 0.1%. Thereafter, the prepreg cut to have a charge ratio of 50% was put into an infrared heater and heated at 255° C. The heated prepreg was arranged in a mold whose temperature was adjusted to 130° C. and which included a standing plane (B) inclined at an angle of 89 degrees with respect to a reference plane (S), and then press-molded at a pressure of 10 MPa for 30 seconds, so that a shaped product including a reference plane (S) and a standing plane (B) each having a thickness of 2.0 mm was obtained. A shear edge portion of the mold was set in the same manner as in Example 1.

Figure 5:
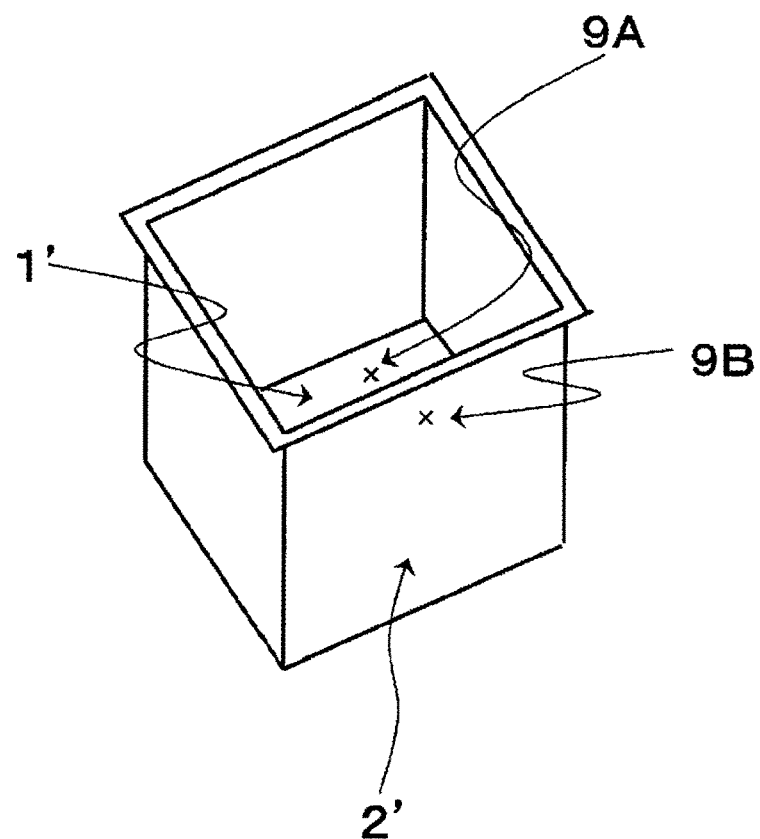
FIG. 5 is a schematic diagram of a shaped product obtained through Example 2.

An angle between the reference plane (S) 1' and the standing plane (B) 2' of the obtained shaped product was 89 degrees, and an area ratio of the standing plane (B) to the reference plane (S) was 12. The material was filled to an end of the obtained shaped product, and any abnormality such as cracks was not observed (Moldability: Good). Furthermore, there was no wrinkle on the surface and an appearance of the shaped product was good (Appearance: Good). Any warpage was not observed (Warpage: Good). FIG. 5 illustrates a schematic diagram of the obtained shaped product. A volume fraction of reinforcing fibers (Vf) of a charging part at a measurement point 9A was 34.2%, and a volume fraction of reinforcing fibers (Vf) of a fluidizing part at a measurement point 9B was 34.8%. Accordingly, those parts showed the values equivalent to each other. Further, a ratio (Eδ) of tensile modulus measured in two directions perpendicular to each other was 1.00 at the measurement point 9A of the charging part and 1.05 at the measurement point 9B of the fluidizing part, which confirmed that each part had an isotropic property. A result is shown in Table 2.

Example 3

Figure 8:
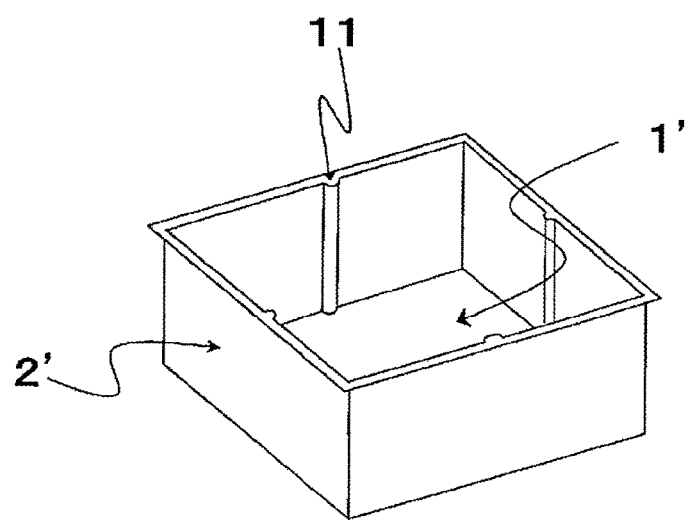
FIG. 8 is a schematic diagram of a shaped product obtained through Example 3.

A plate-shaped prepreg having a thickness of 1.5 mm was obtained by using the random mat obtained in Manufacturing Example 3 and performing an operation in the same manner as in Example 1. A void rate of the prepreg was 0.1%. Thereafter, two sheets of the prepreg cut to have a charge ratio of 70% were put into an infrared heater and heated at 255° C. The heated prepregs were arranged in a mold whose temperature was adjusted to 130° C. and which included an auxiliary flow path (C) 10, a standing plane (B) 2 inclined at an angle of 85 degrees with respect to a reference plane (S) 1 (FIG. 6), and then press-molded at a pressure of 10 MPa for 30 seconds, so that a shaped product including a reference plane (S) and a standing plane (B) each having a thickness of 2.0 mm was obtained. FIG. 7 illustrates a schematic diagram of the auxiliary flow path (C) 10 of the mold used herein. A shear edge portion of the mold was set in the same manner as in Example 1. FIG. 8 illustrates a schematic diagram of the obtained shaped product.

An angle between the reference plane (S) 1' and the standing plane (B) 2' of the obtained shaped product was 85 degrees, and an area ratio of the standing plane (B) to the reference plane (S) was 2. In addition, when a thickness (a) 14 in the vicinity of the auxiliary flow path (C) 10 of the mold in FIG. 7 was 1, a thickness (b) 12 of the auxiliary flow path (C) 10 was 2, and a width (c) 13 of the auxiliary flow path (C) 10 was 5. A cross sectional area (d) of the auxiliary flow path (C) 10 was 8.9 and satisfied the relation as expressed by Formula (3). The material was filled to an end of the obtained shaped product, and any abnormality such as cracks was not observed (Moldability: Good). Furthermore, there was no wrinkle on the surface and an appearance of the shaped product was good (Appearance: Good). Any warpage was not observed (Warpage: Good). A volume fraction of reinforcing fibers (Vf) of a charging part was 34.9%, and a volume fraction of reinforcing fibers (Vf) of a fluidizing part was 35.0%. Accordingly, those parts showed the values equivalent to each other. In addition, a ratio (Eδ) of tensile modulus measured in two directions perpendicular to each other was 1.08 at the charging part A and 1.02 at the fluidizing part, which confirmed that each part had an isotropic property. A result is shown in Table 2. An area ratio and a dimension ratio of the obtained shaped product to the mold were also equivalent in value.

Example 4

Figure 9:
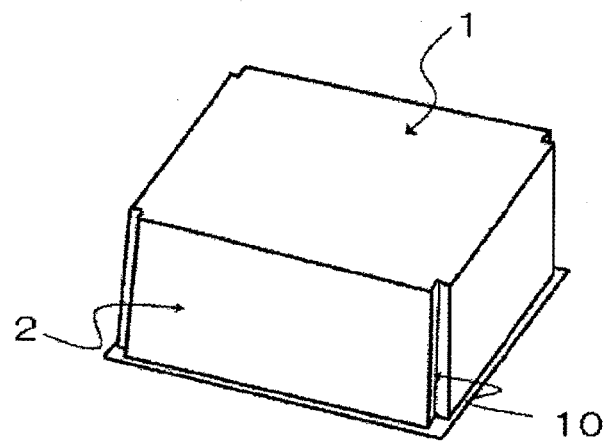
FIG. 9 is a schematic diagram of a mold (of a core mold) used in Example 4.
Figure 10:
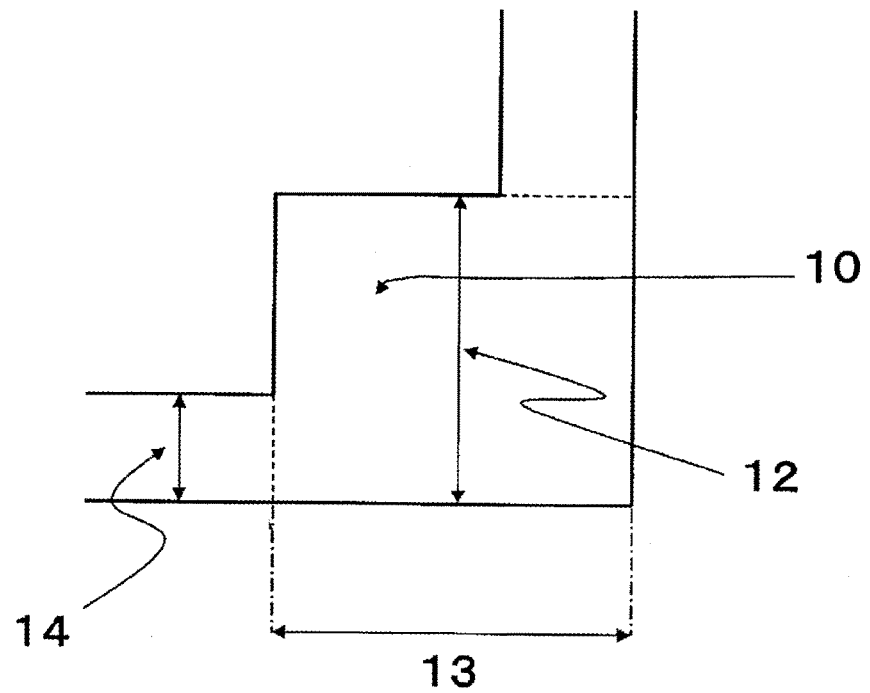
FIG. 10 is a cross-sectional view of an auxiliary flow path (C) of Example 4.

A shaped product including a reference plane (S) and a standing plane (B) each having a thickness of 2.0 mm was obtained in the same manner as in Example 3 except that a mold as depicted in FIG. 9 was used. FIG. 10 illustrates a schematic diagram of an auxiliary flow path (C) 10 of the mold used herein. An angle between the reference plane (S) 1 and the standing plane (B) 2 of the shaped product was 85 degrees, and an area ratio of the standing plane (B) to the reference plane (S) was 2. Moreover, when a thickness (a) 14 in the vicinity of the auxiliary flow path (C) 10 of the mold in FIG. 10 was 1, a thickness (b) 12 of the auxiliary flow path (C) 10 was 2, and a width (c) 13 of the auxiliary flow path (C) 10 was 2. A cross sectional area (d) of the auxiliary flow path (C) 10 was 4 and satisfied the relation as expressed by Formula (3). An area ratio and a dimension ratio of the obtained shaped product to the mold were also equivalent in value.

Figure 11:
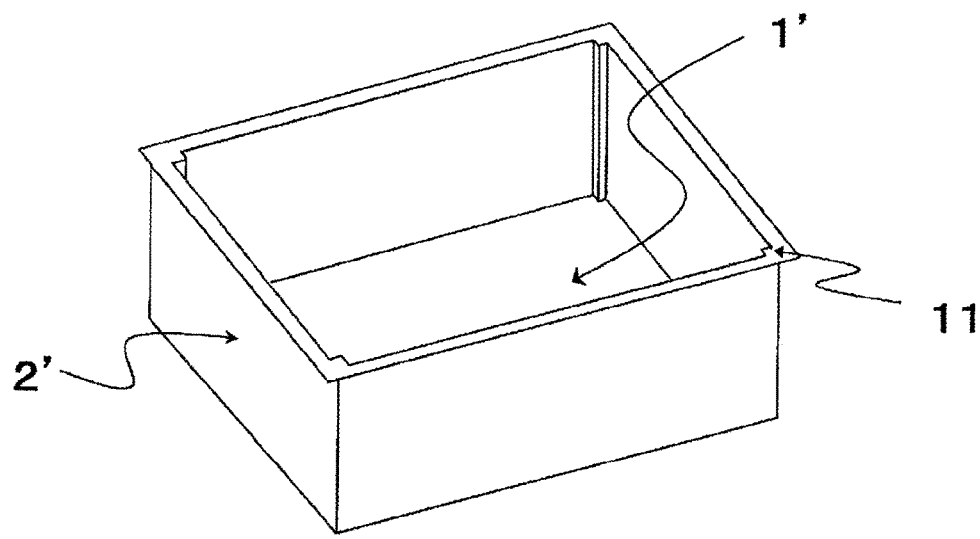
FIG. 11 is a schematic diagram of a shaped product obtained through Example 4.

The material was filled to an end of the obtained shaped product, and any abnormality such as cracks was not observed (Moldability: Good). Moreover, there was no wrinkle on the surface and an appearance of the shaped product was good (Appearance: Good). Any warpage was not observed (Warpage: Good). A volume fraction of reinforcing fibers (Vf) of a charging part was 35.3%, and a volume fraction of reinforcing fibers (Vf) of a fluidizing part was 35.3%. Accordingly, those parts showed the values equivalent to each other. Further, a ratio (Eδ) of tensile modulus measured in two directions perpendicular to each other was 1.00 at the charging part A and 1.02 at the fluidizing part, which confirmed that each part had an isotropic property. FIG. 11 illustrates a schematic diagram of the obtained shaped product. A result is shown in Table 2.

Example 5

Figure 12:
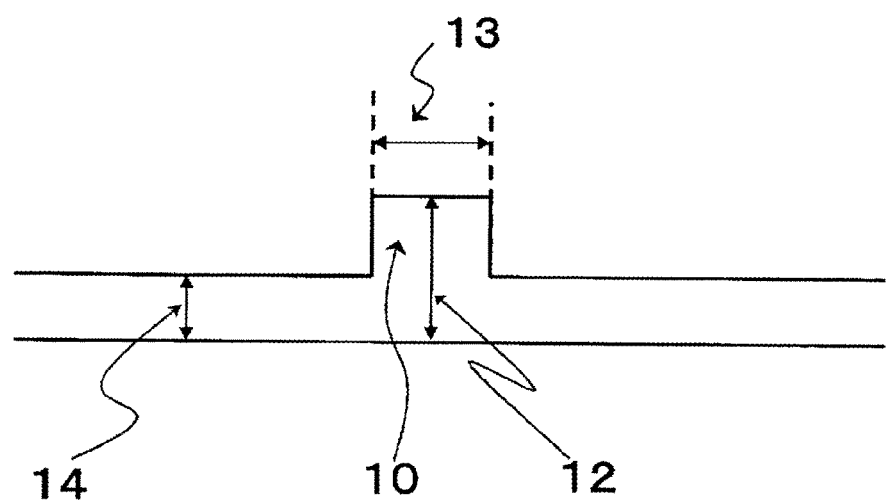
FIG. 12 is a cross-sectional view of an auxiliary flow path (C) of Example 5.
Figure 13:
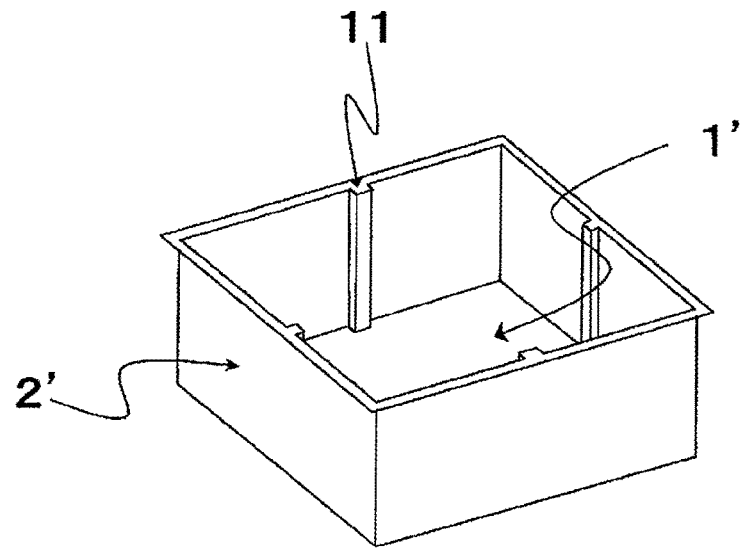
FIG. 13 is a schematic diagram of a shaped product obtained through Example 5.

A shaped product including a reference plane (S) 1' and a standing plane (B) 2' each having a thickness of 2.0 mm was obtained in the same manner as in Example 3 except that a mold including an auxiliary flow path (C) 10 as depicted in FIG. 12 was used. FIG. 13 illustrates a schematic diagram of the obtained shaped product. An angle between the reference plane (S) 1 and the standing plane (B) 2 of the shaped product was 85 degrees, and an area ratio of the standing plane (B) 2 to the reference plane (S) 1 was 2. Furthermore, when a thickness (a) 14 in the vicinity of the auxiliary flow path (C) 10 of the mold in FIG. 12 was 1, a thickness (b) 12 of the auxiliary flow path (C) 10 was 2, and a width (c) 13 of the auxiliary flow path (C) 10 was 2. A cross sectional area (d) of the auxiliary flow path (C) 10 was 4 and satisfied the relation as expressed by Formula (3). An area ratio and a dimension ratio of the obtained shaped product to the mold were also equivalent in value.

The material was filled to an end of the obtained shaped product, and any abnormality such as cracks was not observed (Moldability: Good). Further, there was no wrinkle on the surface and an appearance of the shaped product was good (Appearance: Good). Any warpage was not observed (Warpage: Good). A volume fraction of reinforcing fibers (Vf) of a charging part was 34.6%, and a volume fraction of reinforcing fibers (Vf) of a fluidizing part was 35.0%. Accordingly, those parts showed the values equivalent to each other. Furthermore, a ratio (Eδ) of tensile modulus measured in two directions perpendicular to each other was 1.09 at the charging part and 1.08 at the fluidizing part, which confirmed that each part had an isotropic property. A result is shown in Table 2.

Example 6

Figure 14:
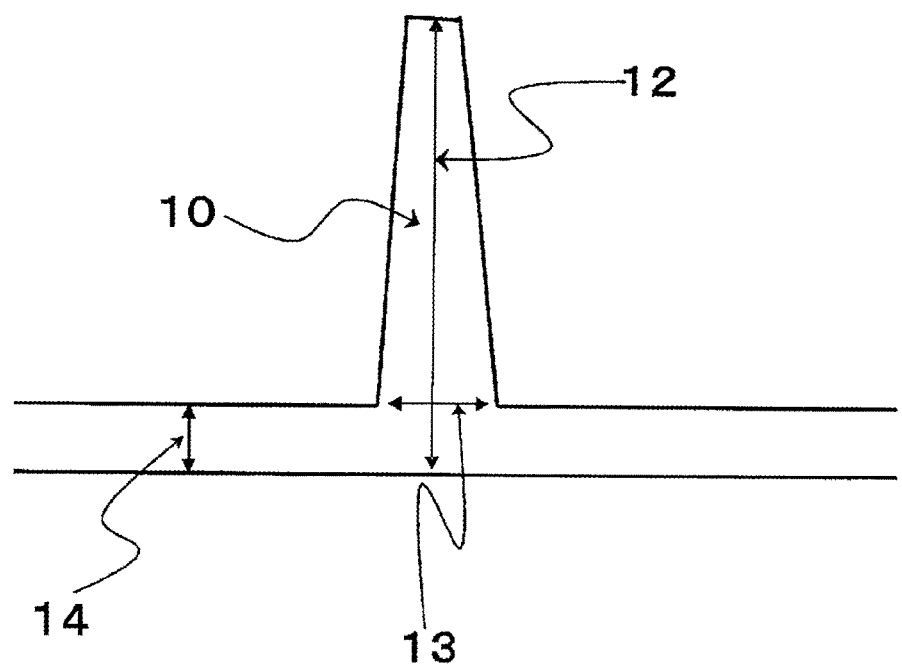
FIG. 14 is a cross-sectional view of an auxiliary flow path (C) of Example 6.
Figure 15:
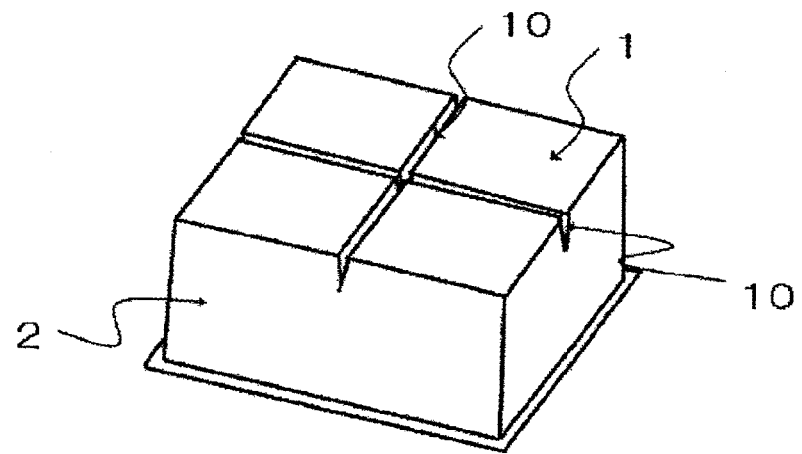
FIG. 15 is a schematic diagram of a mold (in a core mold) used in Example 6.
Figure 16:
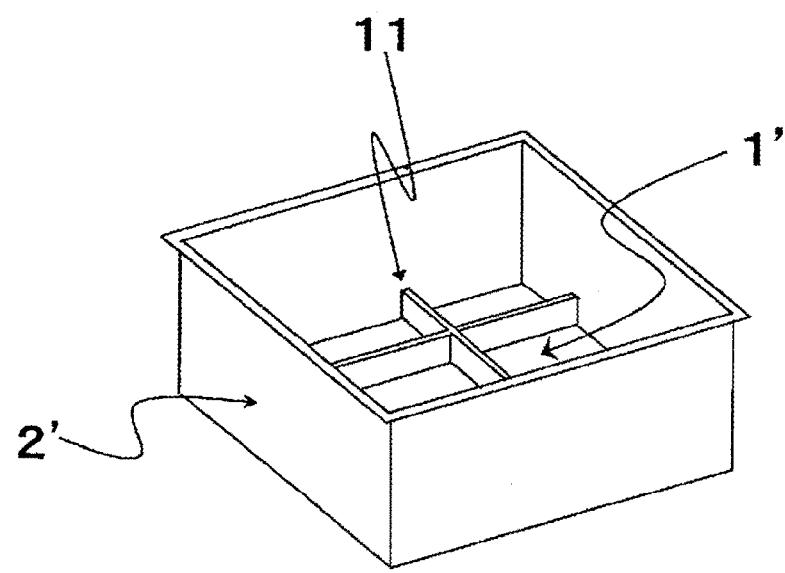
FIG. 16 is a schematic diagram of a shaped product obtained through Example 6.

A shaped product including a reference plane (S) and a standing plane (B) each having a thickness of 2.0 mm was obtained in the same manner as in Example 3 except that a mold (FIG. 15) including an auxiliary flow path (C) 10 having a shape as depicted in FIG. 14 was used. FIG. 16 illustrates a schematic diagram of this shaped product. An angle between the reference plane (S) 1' and the standing plane (B) 2' of the shaped product was 85 degrees, and an area ratio of the standing plane (B) to the reference plane (S) was 2. In addition, when a thickness (a) 14 in the vicinity of the auxiliary flow path (C) 10 of the mold in FIG. 14 was 1, a thickness (b) 12 of the auxiliary flow path (C) 10 was 6, and a width (c) 13 of the auxiliary flow path (C) 10 was 2. A cross sectional area (d) of the auxiliary flow path (C) 10 was 9.5 and satisfied the relation as expressed by Formula (3). An area ratio and a dimension ratio of the obtained shaped product to the mold were also equivalent in value.

The material was filled to an end of the obtained shaped product, and any abnormality such as cracks was not observed (Moldability: Good). Further, there was no wrinkle on the surface and an appearance of the shaped product was good (Appearance: Good). Any warpage was not observed (Warpage: Good). A volume fraction of reinforcing fibers (Vf) of a charging part was 34.6%, and a volume fraction of reinforcing fibers (Vf) of a fluidizing part was 34.9%. Accordingly, those parts showed the values equivalent to each other. Moreover, a ratio (Eδ) of tensile modulus measured in two directions perpendicular to each other was 1.07 at the charging part and 1.08 at the fluidizing part, which confirmed that each part had an isotropic property. A result is shown in Table 2.

Example 7

Figure 18:
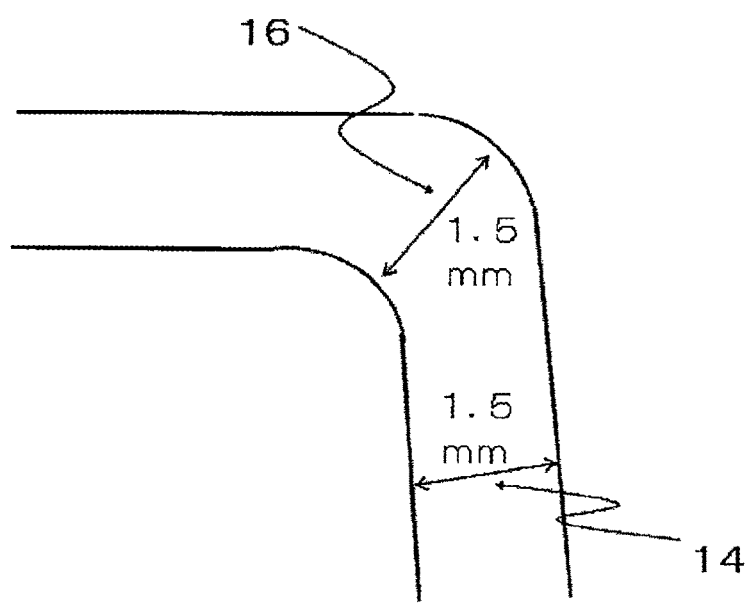
FIG. 18 is a cross-sectional view of a chamfer portion (D) of Example 7.

A plate-shaped prepreg having a thickness of 0.6 mm was obtained by using the random mat obtained in Manufacturing Example 4 and performing an operation in the same manner as in Example 1. A void rate of the prepreg was 0.1%. Thereafter, three sheets of the prepreg cut to have a charge ratio of 85% were put into an infrared heater and heated at 255° C. The heated prepregs were arranged in a mold, as depicted in FIG. 17, whose temperature was adjusted to 130° C. and which included a chamfer portion 15 having a maximum thickness (L2) of 1.5 mm, a standing plane (B) 2 inclined at an angle of 85 degrees with respect to a reference plane (S) 1, and then press-molded at a pressure of 10 MPa for 30 seconds, so that a shaped product including a reference plane (S) and a standing plane (B) each having a thickness of 1.5 mm and a chamfer portion (D) having a maximum thickness (L2) of 1.5 mm was obtained. FIG. 18 illustrates a schematic diagram of the chamfer portion. The mold used for molding had cavities corresponding to the thickness of the reference plane (S) of the shaped product, a thickness (L1) of the standing plane (B), and the maxim thickness (L2) of the chamfer portion (D). A shear edge portion of the mold was set in the same manner as in Example 1.

An angle between the reference plane (S) and the standing plane (B) of the shaped product was 85 degrees, and an area ratio of the standing plane (B) to the reference plane (S) was 2. The material was filled to an end of the obtained shaped product, and any abnormality such as cracks was not observed (Moldability: Good). Further, there was no wrinkle on the surface and an appearance of the shaped product was good (Appearance: Good). Any warpage was not observed (Warpage: Good). A volume fraction of reinforcing fibers (Vf) of a charging part was 35.1%, and a volume fraction of reinforcing fibers (Vf) of a fluidizing part was 34.7%. Accordingly, those parts showed the values equivalent to each other. Furthermore, a ratio (Eδ) of tensile modulus measured in two directions perpendicular to each other was 1.05 at the charging part and 1.07 at the fluidizing part, which confirmed that each part had an isotropic property. A result is shown in Table 2.

Example 8

Figure 19:
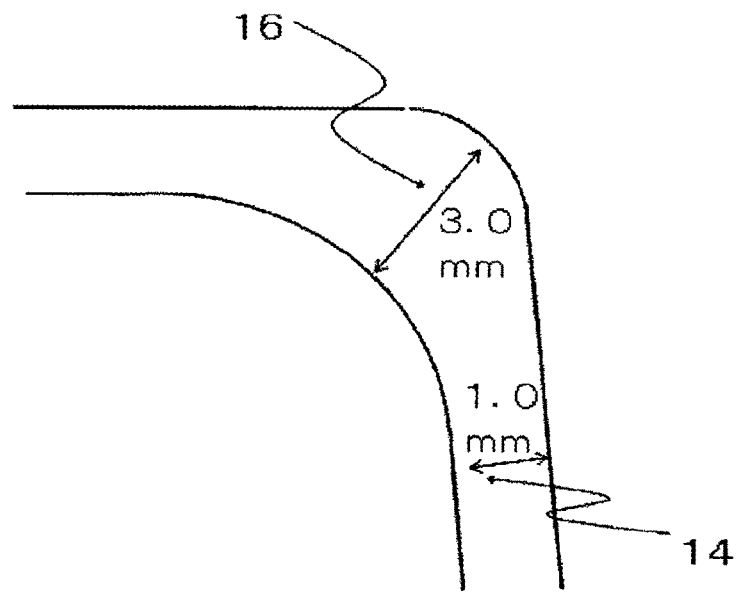
FIG. 19 is a cross-sectional view of a chamfer portion (D) of Example 8.

A plate-shaped prepreg having a thickness of 0.6 mm and containing carbon fibers with an average fiber length of 10 mm as reinforcing fibers was obtained by using the random mat obtained in Manufacturing Example 5 and performing an operation in the same manner as in Example 1. A void rate of the prepreg was 0.1%. Thereafter, a shaped product including a reference plane (S) with a thickness of 1.0 mm and a standing plane (B) with a thickness (L1) of 1.0 mm was obtained in the same manner as in Example 7 except that a chamfer portion (D) of a mold had a shape as illustrated in FIG. 19 and two sheets of the prepreg was were layered. An angle between the reference plane (S) and the standing plane (B) of the shaped product was 85 degrees, and an area ratio of the standing plane (B) to the reference plane (S) was 2. Further, the chamfer portion (D) had a maximum thickness (L2) of 3.0 mm. The mold used for molding had cavities corresponding to the thickness of the reference plane (S) of the shaped product, the thickness (L1) of the standing plane (B), and the maxim thickness (L2) of the chamfer portion (D).

The material was filled to an end of the obtained shaped product, and any abnormality such as cracks was not observed (Moldability: Good). Furthermore, there was no wrinkle on the surface and an appearance of the shaped product was good (Appearance: Good). Any warpage was not observed (Warpage: Good). A volume fraction of reinforcing fibers (Vf) of a charging part was 35.0%, and a volume fraction of reinforcing fibers (Vf) of a fluidizing part was 35.0%. Accordingly, those parts showed the values equivalent to each other. Further, a ratio (Eδ) of tensile modulus measured in two directions perpendicular to each other was 1.05 at the charging part and 1.03 at the fluidizing part, which confirmed that each part had an isotropic property. A result is shown in Table 2.

Example 9

Figure 20:
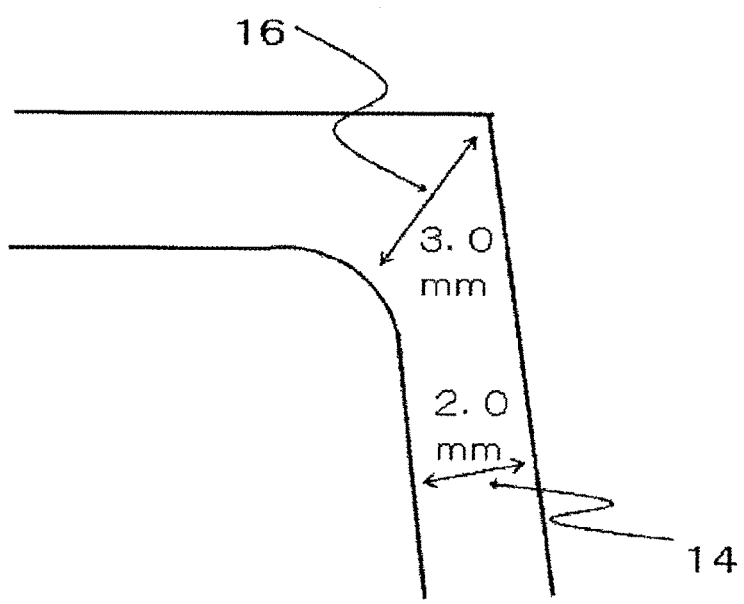
FIG. 20 is a cross-sectional view of a chamfer portion (D) of Example 9.

A plate-shaped prepreg having a thickness of 0.6 mm and containing carbon fibers with an average fiber length of 50 mm as reinforcing fibers was obtained by using the random mat obtained in Manufacturing Example 6 and performing an operation in the same manner as in Example 1. A void rate of the prepreg was 0.1%. Thereafter, a shaped product including a reference plane (S) with a thickness of 1.0 mm and a standing plane (B) with a thickness (L1) of 1.0 mm was obtained in the same manner as in Example 7 except that a chamfer portion (D) of a mold had a shape as illustrated in FIG. 20, a charge ratio of the prepreg was 70%, and five sheets of the prepreg was were layered. An angle between the reference plane (S) and the standing plane (B) of the shaped product was 85 degrees, and an area ratio of the standing plane (B) to the reference plane (S) was 2. In addition, the chamfer portion (D) had a maximum thickness (L2) of 3.0 mm. The mold used for molding had cavities corresponding to the thickness of the reference plane (S) of the shaped product, the thickness (1) of the standing plane (B), and the maxim thickness (L2) of the chamfer portion (D).

The material was filled to an end of the obtained shaped product, and any abnormality such as cracks was not observed (Moldability: Good). Moreover, there was no wrinkle on the surface and an appearance of the shaped product was good (Appearance: Good). Any warpage was not observed (Warpage: Good). A volume fraction of reinforcing fibers (Vf) of a charging part was 35.1%, and a volume fraction of reinforcing fibers (Vf) of a fluidizing part was 34.9%. Accordingly, those parts showed the values equivalent to each other. Further, a ratio (Eδ) of tensile modulus measured in two directions perpendicular to each other was 1.03 at the charging part and 1.05 at the fluidizing part, which confirmed that each part had an isotropic property. A result is shown in Table 2.

Example 10

Figure 21:
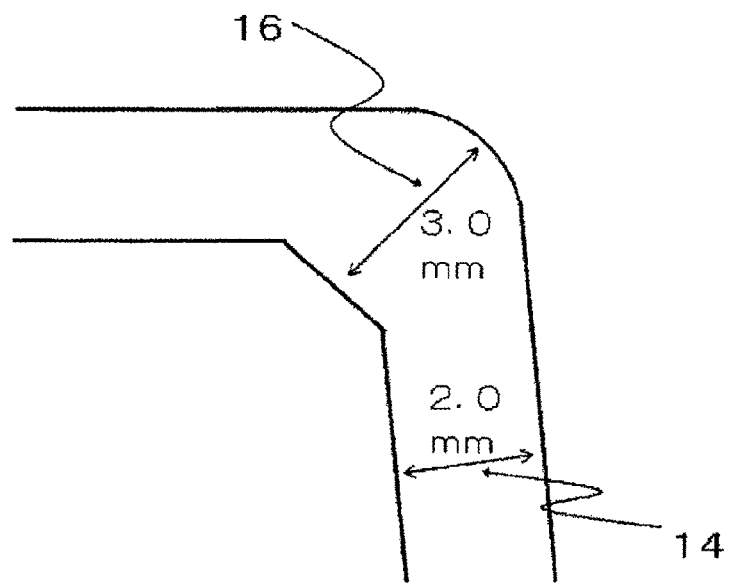
FIG. 21 is a cross-sectional view of a chamfer portion (D) of Example 10.

A plate-shaped prepreg having a thickness of 0.6 mm and containing carbon fibers with a single fiber diameter of 5 μm and an average fiber length of 20 mm as reinforcing fibers was obtained by using the random mat obtained in Manufacturing Example 7 and performing an operation in the same manner as in Example 1. A void rate of the prepreg was 0.1%. Thereafter, a shaped product including a reference plane (S) with a thickness of 2.0 mm and a standing plane (B) with a thickness (L1) of 2.0 mm was obtained in the same manner as in Example 9 except that a chamfer portion (D) of a mold had a shape as illustrated in FIG. 21. An angle between the reference plane (S) and the standing plane (B) of the shaped product was 85 degrees, and an area ratio of the standing plane (B) to the reference plane (S) was 2. Furthermore, the chamfer portion (D) had a maximum thickness (L2) of 3.0 mm. The mold used for molding had cavities corresponding to the thickness of the reference plane (S) of the shaped product, the thickness (L1) of the standing plane (B), and the maxim thickness (L2) of the chamfer portion (D).

The material was filled to an end of the obtained shaped product, and any abnormality such as cracks was not observed (Moldability: Good). Further, there was no wrinkle on the surface and an appearance of the shaped product was good (Appearance: Good). Any warpage was not observed (Warpage: Good). A volume fraction of reinforcing fibers (Vf) of a charging part was 34.9%, and a volume fraction of reinforcing fibers (Vf) of a fluidizing part was 34.3%. Accordingly, those parts showed the values equivalent to each other. Furthermore, a ratio (Eδ) of tensile modulus measured in two directions perpendicular to each other was 1.05 at the charging part and 1.09 at the fluidizing part, which confirmed that each part had an isotropic property. A result is shown in Table 2.

Example 11

The random mat obtained in Manufacturing Example 8 was heated up to 210° C. and then pressurized at a pressure of 3 MPa for 7 minutes. Subsequently, the random mat was cooled down to 80° C., so that a plate-shaped prepreg having a thickness of 2.5 mm and containing a polypropylene resin as a matrix resin was obtained. A void rate of the prepreg was 0.2%. Thereafter, the prepreg cut to have a charge ratio of 80% was put into an infrared heater and heated at 220° C. The heated prepreg was arranged in a mold whose temperature was adjusted to 100° C. and which included a standing plane (B) inclined at an angle of 85 degrees with respect to a reference plane (S), and then press-molded at a pressure of 20 MPa for 30 seconds, so that a shaped product including a reference plane (S) and a standing plane (B) each having a thickness of 2.0 mm was obtained. A shear edge portion of the mold was set in the same manner as in Example 1.

An angle between the reference plane (S) and the standing plane (B) of the shaped product was 85 degrees, and an area ratio of the standing plane (B) to the reference plane (S) was 2. The material was filled to an end of the obtained shaped product, and any abnormality such as cracks was not observed (Moldability: Good). Further, there was no wrinkle on the surface and an appearance of the shaped product was good (Appearance: Good). Any warpage was not observed (Warpage: Good). A volume fraction of reinforcing fibers (Vf) of a charging part was 34.8%, and a volume fraction of reinforcing fibers (Vf) of a fluidizing part was 35.3%. Accordingly, those parts showed the values equivalent to each other. Moreover, a ratio (Eδ) of tensile modulus measured in two directions perpendicular to each other was 1.05 at the charging part and 1.07 at the fluidizing part, which confirmed that each part had an isotropic property. A result is shown in Table 2.

Example 12

The random mat obtained in Manufacturing Example 9 was heated up to 260° C. and then pressurized at a pressure of 3 MPa for 7 minutes. Thereafter, the random mat was cooled down to 80° C., so that a plate-shaped prepreg having a thickness of 2.5 mm and containing a polycarbonate resin as a matrix resin was obtained. A void rate of the prepreg was 0.2%. Thereafter, the prepreg cut to have a charge ratio of 80% was put into an infrared heater and heated at 270° C. The heated prepreg was arranged in a mold whose temperature was adjusted to 100° C. and which included a standing plane (B) inclined at an angle of 85 degrees with respect to a reference plane (S), and then press-molded at a pressure of 20 MPa for 30 seconds, so that a shaped product including a reference plane (S) and a standing plane (B) each having a thickness of 2.0 mm was obtained. A shear edge portion of the mold was set in the same manner as in Example 1.

An angle between the reference plane (S) and the standing plane (B) of the shaped product was 85 degrees, and an area ratio of the standing plane (B) to the reference plane (S) was 2. The material was filled to an end of the obtained shaped product, and any abnormality such as cracks was not observed (Moldability: Good). Further, there was no wrinkle on the surface and an appearance of the shaped product was good (Appearance: Good). Any warpage was not observed (Warpage: Good). A volume fraction of reinforcing fibers (Vf) of a charging part was 34.9%, and a volume fraction of reinforcing fibers (Vf) of a fluidizing part was 34.3%. Accordingly, those parts showed the values equivalent to each other. In addition, a ratio (Eδ) of tensile modulus measured in two directions perpendicular to each other was 1.05 at the charging part and 1.05 at the fluidizing part, which confirmed that each part had an isotropic property. A result is shown in Table 2.

Example 13

The random mat obtained in Manufacturing Example 10 was heated up to 260° C. and then pressurized at a pressure of 3 MPa for 7 minutes. Thereafter, the random mat was cooled down to 80° C., so that a plate-shaped prepreg having a thickness of 2.5 mm and containing a polybutylene terephthalate resin as a matrix resin was obtained. A void rate of the prepreg was 0.2%. Thereafter, the prepreg cut to have a charge ratio of 80% was put into an infrared heater and heated at 270° C. The heated prepreg was arranged in a mold whose temperature was adjusted to 100° C. and which included a standing plane (B) inclined at an angle of 85 degrees with respect to a reference plane (S), and then press-molded at a pressure of 20 MPa for 30 seconds, so that a shaped product including a reference plane (S) and a standing plane (B) each having a thickness of 2.0 mm was obtained. A shear edge portion of the mold was set in the same manner as in Example 1.

An angle between the reference plane (S) and the standing plane (B) of the shaped product was 85 degrees, and an area ratio of the standing plane (B) to the reference plane (S) was 2. The material was filled to an end of the obtained shaped product, and any abnormality such as cracks was not observed (Moldability: Good). In addition, there was no wrinkle on the surface and an appearance of the shaped product was good (Appearance: Good). Any warpage was not observed (Warpage: Good). A volume fraction of reinforcing fibers (Vf) of a charging part was 34.7%, and a volume fraction of reinforcing fibers (Vf) of a fluidizing part was 34.0%. Accordingly, those parts showed the values equivalent to each other. Furthermore, a ratio (Eδ) of tensile modulus measured in two directions perpendicular to each other was 1.06 at the charging part and 1.05 at the fluidizing part, which confirmed that each part had an isotropic property. A result is shown in Table 2.

Example 14

A plate-shaped prepreg having a thickness of 2.5 mm and containing glass fibers with a single fiber diameter of 15 μm and an average fiber length of 20 mm as reinforcing fibers was obtained by using the random mat obtained in Manufacturing Example 11 and performing an operation in the same manner as in Example 1 except that a holding time was 5 minutes. A void rate of the prepreg was 0.1%. Thereafter, two sheets of the prepreg cut to have a charge ratio of 80% were put into an infrared heater and heated at 255° C. The heated prepregs were laminated and arranged in a mold whose temperature was adjusted to 130° C. and which included a standing plane (B) inclined at an angle of 85 degrees with respect to a reference plane (S), and then press-molded at a pressure of 10 MPa for 60 seconds, so that a shaped product including a reference plane (S) and a standing plane (B) each having a thickness of 4.0 mm was obtained. A shear edge portion of the mold was set in the same manner as in Example 1.

An angle between the reference plane (S) and the standing plane (B) of the shaped product was 85 degrees, and an area ratio of the standing plane (B) to the reference plane (S) was 2. The material was filled to an end of the obtained shaped product, and any abnormality such as cracks was not observed (Moldability: Good). Further, there was no wrinkle on the surface and an appearance of the shaped product was good (Appearance: Good). Any warpage was not observed (Warpage: Good). A volume fraction of reinforcing fibers (Vf) of a charging part was 27.0%, and a volume fraction of reinforcing fibers (Vf) of a fluidizing part was 26.0%. Accordingly, those parts showed the values equivalent to each other. Furthermore, a ratio (Eδ) of tensile modulus measured in two directions perpendicular to each other was 1.05 at the charging part and 1.03 at the fluidizing part, which confirmed that each part had an isotropic property. A result is shown in Table 2.

Example 15

Figure 22:
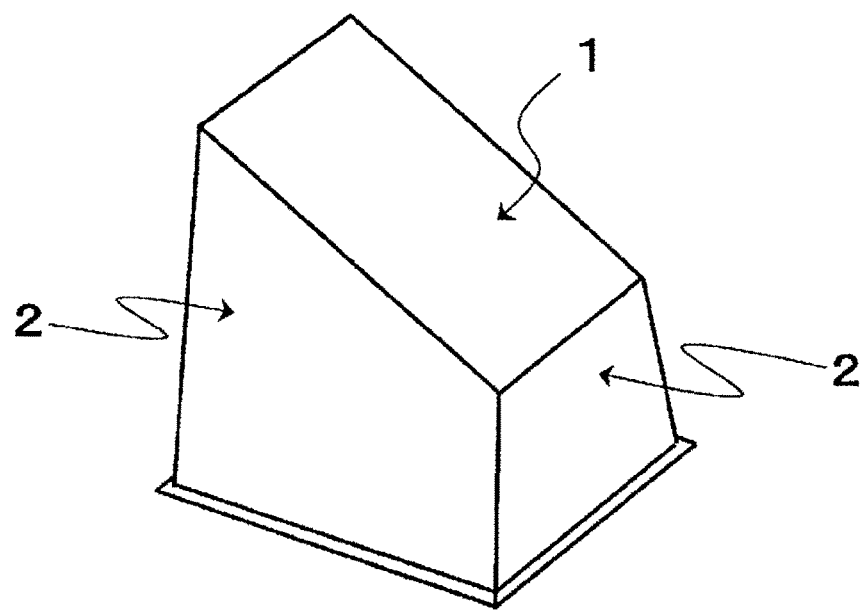
FIG. 22 is a perspective view of a mold (in a core mold) of Example 15.
Figure 23:
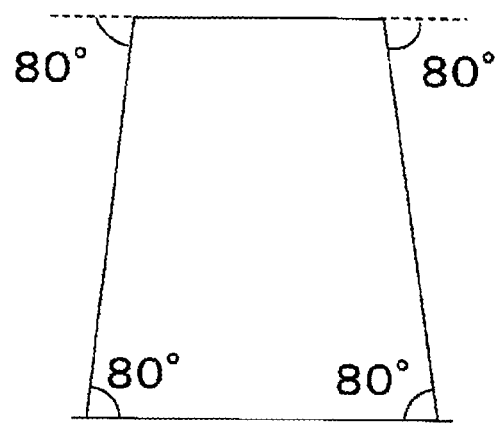
FIG. 23 is a rear view of the mold (in a core mold) of Example 15.
Figure 24:
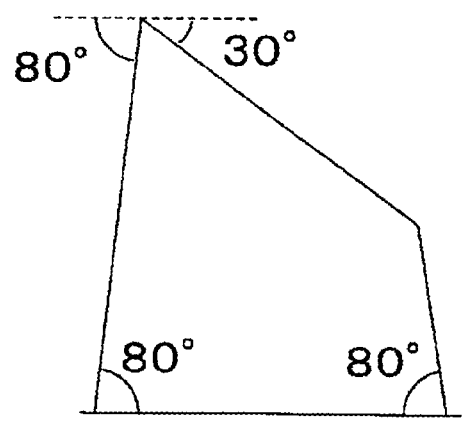
FIG. 24 is a side view of the mold (in a core mold) of Example 15.

A shaped product including a reference plane and a standing plane each having a thickness of 2.0 mm was obtained in the same manner as in Example 1 except that there was used a mold in which the reference plane was a plane inclined at an angle of 30 degrees and an area ratio of a standing plane to a reference plane was 3 (and whose perspective view, rear view, and side view are provided in FIGS. 22 to 24, respectively). A shear edge portion of the mold was set in the same manner as in Example 1. An area ratio of a standing plane (B) to a reference plane (S) was 3.

The material was filled to an end of the obtained shaped product, and any abnormality such as cracks was not observed (Moldability: Good). Moreover, there was no wrinkle on the surface and an appearance of the shaped product was good (Appearance: Good). Any warpage was not observed (Warpage: Good). A volume fraction of reinforcing fibers (Vf) of a charging part was 34.8%, and a volume fraction of reinforcing fibers (Vf) of a fluidizing part was 34.3%. Accordingly, those parts showed the values equivalent to each other. Further, a ratio (Eδ) of tensile modulus measured in two directions perpendicular to each other was 1.05 at the charging part and 1.07 at the fluidizing part, which confirmed that each part had an isotropic property. A result is shown in Table 2.

Example 16

A plate-shaped prepreg having a thickness of 2.5 mm was obtained by using the random mat obtained in Manufacturing Example 12 and performing an operation in the same manner as in Example 1 except that a holding time was 3 minutes. A void rate of the prepreg was 0.3%. Thereafter, a shaped product including a reference plane (S) and a standing plane (B) each having a thickness of 2.0 mm was obtained in the same manner as in Example 1 except that there was used as mold in which an area ratio of a standing plane (B) to a reference plane (S) was 2. A shear edge portion of the mold was set in the same manner as in Example 1.

An angle between the reference plane (S) and the standing plane (B) of the shaped product was 85 degrees, and an area ratio of the standing plane (B) to the reference plane (S) was 2. The material was filled to an end of the obtained shaped product, and any abnormality such as cracks was not observed (Moldability: Good). Furthermore, there was no wrinkle on the surface and an appearance of the shaped product was good (Appearance: Good). Any warpage was not observed (Warpage: Good). A volume fraction of reinforcing fibers (Vf) of a charging part was 35.2%, and a volume fraction of reinforcing fibers (Vf) of a fluidizing part was 34.7%. Accordingly, those parts showed the values equivalent to each other. In addition, a ratio (Eδ) of tensile modulus measured in two directions perpendicular to each other was 1.03 at the charging part and 1.06 at the fluidizing part, which confirmed that each part had an isotropic property. A result is shown in Table 2.

Example 17

A plate-shaped prepreg having a thickness of 2.5 mm was obtained by using the random mat obtained in Manufacturing Example 13 and performing an operation in the same manner as in Example 1. A void rate of the prepreg was 0.2%. Thereafter, a shaped product including a reference plane (S) and a standing plane (B) each having a thickness of 2.0 mm was obtained in the same manner as in Example 1 except that there was used as mold in which an area ratio of a standing plane (B) to a reference plane (S) was 2. A shear edge portion of the mold was set in the same manner as in Example 1.

An angle between the reference plane (S) and the standing plane (B) of the shaped product was 85 degrees, and an area ratio of the standing plane (B) to the reference plane (S) was 2. The material was filled to an end of the obtained shaped product, and any abnormality such as cracks was not observed (Moldability: Good). Further, there was no wrinkle on the surface and an appearance of the shaped product was good (Appearance: Good). Any warpage was not observed (Warpage: Good). A volume fraction of reinforcing fibers (Vf) of a charging part was 19.8%, and a volume fraction of reinforcing fibers (Vf) of a fluidizing part was 19.0%. Accordingly, those parts showed the values equivalent to each other. Furthermore, a ratio (Eδ) of tensile modulus measured in two directions perpendicular to each other was 1.07 at the charging part and 1.09 at the fluidizing part, which confirmed that each part had an isotropic property. A result is shown in Table 2.

Example 18

A plate-shaped prepreg having a thickness of 2.5 mm was obtained by using the random mat obtained in Manufacturing Example 14 and performing an operation in the same manner as in Example 1. A void rate of the prepreg was 0.2%. Thereafter, a shaped product including a reference plane (S) and a standing plane (B) each having a thickness of 2.0 mm was obtained in the same manner as in Example 1 except that there was used as mold in which an area ratio of a standing plane (B) to a reference plane (S) was 2. A shear edge portion of the mold was set in the same manner as in Example 1.

An angle between the reference plane (S) and the standing plane (B) of the shaped product was 85 degrees, and an area ratio of the standing plane (B) to the reference plane (S) was 2. The material was filled to an end of the obtained shaped product, and any abnormality such as cracks was not observed (Moldability: Good). Furthermore, there was no wrinkle on the surface and an appearance of the shaped product was good (Appearance: Good). Any warpage was not observed (Warpage: Good). A volume fraction of reinforcing fibers (Vf) of a charging part was 45.3%, and a volume fraction of reinforcing fibers (Vf) of a fluidizing part was 44.5%. Accordingly, those parts showed the values equivalent to each other. Further, a ratio (Eδ) of tensile modulus measured in two directions perpendicular to each other was 1.05 at the charging part and 1.09 at the fluidizing part, which confirmed that each part had an isotropic property. A result is shown in Table 2.

Comparative Example 1

A plate-shaped prepreg having a thickness of 2.7 mm was obtained by using the random mat obtained in Manufacturing Example 15 and performing an operation in the same manner as in Example 1. A void rate of the prepreg was 12.1%. A shaped product was obtained by using this prepreg in the same manner as in Example 1.

A thickness of a reference plane (S) of the obtained shaped product was 2.1 mm, but a thickness of a standing plane (B) was 1.2 to 1.5 mm. That is, the obtained shaped product was non-uniform in thickness. In addition, the material was not filled to an end of the shaped product (Moldability: Very bad). The surface of the shaped product was not smooth, and dry carbon fibers where the resin was not sufficiently impregnated were observed (Appearance: Very bad). A volume fraction of reinforcing fibers (Vf) of a charging part was 28.3%, and a volume fraction of reinforcing fibers (Vf) of a fluidizing part was 35.7%. Accordingly, a great difference therebetween was confirmed. Moreover, a ratio (Eδ) of tensile modulus measured in two directions perpendicular to each other was 1.10 at the charging part and 2.40 at the fluidizing part. Accordingly, the fluidizing part had an anisotropic property. A result is shown in Table 2.

Comparative Example 2

A plate-shaped prepreg having a thickness of 1.7 mm was obtained by using the random mat obtained in Manufacturing Example 16 and performing an operation in the same manner as in Example 3. A void rate of the prepreg was 12.1%. A shaped product was obtained by using this prepreg, using a mold having the same shape as illustrated in FIG. 6 except that there was no auxiliary flow path (C), and performing an operation in the same manner as in Example 3.

A thickness of a reference plane (S) of the obtained shaped product was 2.2 mm, but a thickness of a standing plane (B) was 1.2 to 1.7 mm. That is, the obtained shaped product was non-uniform in thickness. Further, the material was not filled to an end of the shaped product (Moldability: Very bad). The surface of the shaped product was not smooth, and dry carbon fibers where the resin was not sufficiently impregnated were observed (Appearance: Very bad). A volume fraction of reinforcing fibers (Vf) of a charging part was 28.3%, and a volume fraction of reinforcing fibers (Vf) of a fluidizing part was 35.7%. Accordingly, a great difference therebetween was confirmed. Furthermore, a ratio (Eδ) of tensile modulus measured in two directions perpendicular to each other was 1.08 at the charging part and 2.75 at the fluidizing part. Accordingly, the fluidizing part had an anisotropic property. A result is shown in Table 2.

Comparative Example 3

Figure 6:
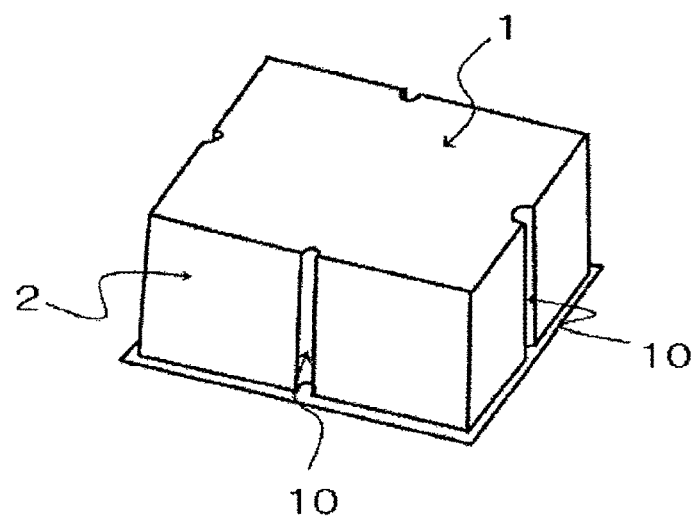
FIG. 6 is a schematic diagram of a mold (of a core mold) used in Example 3.

A shaped product was obtained in the same manner as in Comparative Example 2 except that a mold including an auxiliary flow path (C) as illustrated in FIG. 6 was used. A thickness of a reference plane (S) of the obtained shaped product was 2.1 mm, but a thickness of a standing plane (B) was 1.7 to 2.0 mm. That is, the obtained shaped product was non-uniform in thickness. The material was filled to an end of the shaped product, and any abnormality such as cracks was not observed (Moldability: Good). However, the surface of the shaped product was not smooth, and dry carbon fibers where the resin was not sufficiently impregnated were observed (Appearance: Very bad). In the shaped product, a volume fraction of reinforcing fibers (Vf) of a charging part was 34.5%, and a volume fraction of reinforcing fibers (Vf) of a fluidizing part was 32.2%. Accordingly, a difference therebetween was confirmed. Further, a ratio (Eδ) of tensile modulus measured in two directions perpendicular to each other was 1.05 at the charging part and 1.55 at the fluidizing part. Accordingly, the fluidizing part had an anisotropic property. A result is shown in Table 2.

Comparative Example 4

A plate-shaped prepreg having a thickness of 0.7 mm was obtained by using the random mat obtained in Manufacturing Example 17 and performing an operation in the same manner as in Example 7. A void rate of the prepreg was 11.4%. A shaped product was obtained by using this prepreg, and performing an operation in the same manner as in Example 7. A thickness of a reference plane (S) of the obtained shaped product was 1.7 mm, but a thickness of a standing plane (B) was 1.0 to 1.5 mm. That is, the obtained shaped product was non-uniform in thickness. Some defects were observed at an end of the shaped product (Moldability: Bad). Furthermore, dry carbon fibers where the resin was not sufficiently impregnated were observed from the surface of the shaped product (Appearance: Very bad). In the shaped product, a volume fraction of reinforcing fibers (Vf) of a charging part was 33.1%, and a volume fraction of reinforcing fibers (Vf) of a fluidizing part was 30.1%. Accordingly, a difference therebetween was confirmed. Further, a ratio (Eδ) of tensile modulus measured in two directions perpendicular to each other was 1.11 at the charging part and 1.93 at the fluidizing part. Accordingly, the fluidizing part had an anisotropic property. A result is shown in Table 2.

Comparative Example 5

A plate-shaped prepreg having a thickness of 23.5 to 27 4 mm was obtained by using the random mat obtained in Manufacturing Example 18 and performing an operation in the same manner as in Example 1. The obtained prepreg was non-uniform in thickness in a range of 23.5 to 27.4 mm. It was clear that even when a molding process was carried by using this prepreg, a shaped product having a high quality could not be obtained. A result is shown in Table 2.

Comparative Example 6

A plate-shaped prepreg having a thickness of 0.04 mm was obtained by using the random mat obtained in Manufacturing Example 19 and performing an operation in the same manner as in Example 1. The obtained prepreg had a dense distribution of the carbon fibers and was non-uniform in thickness. It was clear that even when a molding process was carried by using this prepreg, a shaped product having a high quality could not be obtained. A result is shown in Table 2.

Comparative Example 7

A plate-shaped prepreg having a thickness of 2.5 mm and containing carbon fibers with an average fiber length of 2 mm as reinforcing fibers was obtained by using the random mat obtained in Manufacturing Example 20 and performing an operation in the same manner as in Example 1. A void rate of the prepreg was 0.2%. Thereafter, a shaped product including a reference plane (S) and a standing plane (B) each having a thickness of 2.0 mm was obtained in the same manner as in Example 1 except that there was used as mold in which an area ratio of a standing plane (B) to a reference plane (S) was 2. A shear edge portion of the mold was set in the same manner as in Example 1.

An angle between the reference plane and the standing plane of the obtained shaped product was 85 degrees, and an area ratio of the standing plane to the reference plane was 2. The material was filled to an end of the obtained shaped product, and any abnormality such as cracks was not observed (Moldability: Good). In addition, there was no wrinkle on the surface and an appearance of the shaped product was good (Appearance: Good). Any warpage was not observed (Warpage: Good). In the shaped product, a volume fraction of reinforcing fibers (Vf) of a charging part was 35.1%, and a volume fraction of reinforcing fibers (Vf) of a fluidizing part was 33.5%. Thus a slight difference therebetween was confirmed. Moreover, a ratio (Eδ) of tensile modulus measured in two directions perpendicular to each other was 1.15 at the charging part and 1.35 at the fluidizing part. Accordingly, it was confirmed that the fluidizing part had an anisotropic property. A result is shown in Table 2.

Comparative Example 8

A plate-shaped prepreg was obtained by using the random mat obtained in Manufacturing Example 21 and performing an operation in the same manner as in Example 1. The obtained prepreg was non-uniform in thickness in a range of 2.3 to 4.5 mm. It was clear that even when a molding process was carried by using this prepreg, a shaped product having a high quality could not be obtained. A result is shown in Table 2.

Comparative Example 9

A plate-shaped prepreg having a thickness of 2.6 mm was obtained by using the random mat obtained in Manufacturing Example 22 and performing an operation in the same manner as in Example 1. A void rate of the prepreg was 5.5%. Thereafter, a shaped product was obtained in the same manner as in Example 1 except that there was used as mold in which an area ratio of a standing plane (B) to a reference plane (S) was 2.

A thickness of a reference plane of the obtained shaped product was 2.1 mm, but a thickness of a standing plane was 1.5 to 2.0 mm. That is, the obtained shaped product was non-uniform in thickness. Further, the material was not filled to an end of the shaped product (Moldability: Very bad). Dry carbon fibers where the resin was not sufficiently impregnated were observed from the surface of the shaped product (Appearance: Very bad). A result is shown in Table 2.

TABLE 1

| | Reinforcing fiber | | | | | | Reinforcing fiber bundle (A) | | |
|---|---|---|---|---|---|---|---|---|---|
| | | (D) Average fiber diameter | Average fiber length | Fiber areal weight | Thermoplastic resin | | Critical number of single | Ratio based on total amount of | (N) Average number |
| Random mat | Kind | (μm) | (mm) | (g/m²) | Kind | Form | fiber | reinforcing fibers (Vol %) | of the fibers (filament) |
| Mfg. Ex. 1 | CF | 7 | 20 | 1540 | PA6 | Powder | 86 | 35 | 240 |
| Mfg. Ex. 2 | CF | 7 | 20 | 2460 | PA6 | Powder | 86 | 95 | 1200 |
| Mfg. Ex. 3 | CF | 7 | 20 | 924 | PA6 | Powder | 86 | 35 | 240 |
| Mfg. Ex. 4 | CF | 7 | 20 | 370 | PA6 | Powder | 86 | 35 | 240 |
| Mfg. Ex. 5 | CF | 7 | 10 | 370 | PA6 | Powder | 86 | 35 | 240 |
| Mfg. Ex. 6 | CF | 7 | 50 | 370 | PA6 | Powder | 86 | 35 | 240 |
| Mfg. Ex. 7 | CF | 5 | 20 | 370 | PA6 | Powder | 120 | 35 | 240 |
| Mfg. Ex. 8 | CF | 7 | 20 | 1540 | PP | Powder | 86 | 35 | 240 |
| Mfg. Ex. 9 | CF | 7 | 20 | 1540 | PC | Powder | 86 | 80 | 1000 |
| Mfg. Ex. 10 | CF | 7 | 20 | 1540 | PBT | Powder | 86 | 50 | 500 |
| Mfg. Ex. 11 | GF | 15 | 20 | 1540 | PA6 | Powder | 40 | 80 | 150 |
| Mfg. Ex. 12 | CF | 7 | 20 | 1540 | PA6 | Molten resin | 86 | 35 | 240 |
| Mfg. Ex. 13 | CF | 7 | 20 | 1540 | PA6 | Powder | 86 | 35 | 240 |
| Mfg. Ex. 14 | CF | 7 | 20 | 1540 | PA6 | Powder | 86 | 35 | 240 |
| Mfg. Ex. 15 | CF | 7 | 20 | 1540 | PA6 | Powder | 86 | 100 | 24000 |
| Mfg. Ex. 16 | CF | 7 | 20 | 924 | PA6 | Powder | 86 | 100 | 24000 |
| Mfg. Ex. 17 | CF | 7 | 20 | 370 | PA6 | Powder | 86 | 100 | 24000 |
| Mfg. Ex. 18 | CF | 7 | 20 | 15000 | PA6 | Powder | 86 | 95 | 1200 |
| Mfg. Ex. 19 | CF | 7 | 20 | 23 | PA6 | Powder | 86 | 50 | 500 |
| Mfg. Ex. 20 | CF | 7 | 2 | 1540 | PA6 | Powder | 86 | 25 | 200 |
| Mfg. Ex. 21 | CF | 7 | 200 | 1540 | PA6 | Powder | 86 | 90 | 800 |
| Mfg. Ex. 22 | CF | 7 | 20 | 1540 | PA6 | Powder | 86 | 10 | 100 |

CF: Carbon fiber, GF: Glass fiber
PA6: Polyamide 6 (Nylon 6), PC: Polycarbonate, PP: Polypropylene, PBT: Polybutylene terephthalate
A volume fraction of reinforcing fibers (Vf) in the random mat of Manufacturing Example 11 was 27 Vol %, Vf in the random mat of Manufacturing Example 13 was 20 Vol %, Vf in the random mat of Manufacturing Example 14 was 45 Vol %, and Vf in the random mat of the other Manufacturing Examples was 35 Vol %.

TABLE 2

| | | | | | Molding condition | | | | |
|---|---|---|---|---|---|---|---|---|---|
| | | Prepreg | | | Standing | | Thickness ratio of auxiliary flow | | Thickness ratio of chamfer |
| Examples of molding | Mfg. Examples of random mat used | Thickness (mm) | Void rate (%) | Charge ratio (%) | plane (B) angle (degree) | Auxiliary flow path (C) | path (C)/vicinity of auxiliary flow path | Chamfer portion (D) | portion (D)/Standing plane (B) |
| Ex. 1 | Mfg. Ex. 1 | 2.5 | 0.1 | 80 | 85 | Absence | — | None | — |
| Ex. 2 | Mfg. Ex. 2 | 4.0 | 0.1 | 50 | 89 | Absence | — | None | — |

TABLE 2-continued

| | | | | | | | | | | |
|---|---|---|---|---|---|---|---|---|---|---|
| Ex. 3 | Mfg. Ex. 3 | 1.5 | 0.1 | 70 | 85 | Presence | 2 | None | — |
| Ex. 4 | Mfg. Ex. 3 | 1.5 | 0.1 | 70 | 85 | Presence | 2 | None | — |
| Ex. 5 | Mfg. Ex. 3 | 1.5 | 0.1 | 70 | 85 | Presence | 2 | None | — |
| Ex. 6 | Mfg. Ex. 3 | 1.5 | 0.1 | 70 | 85 | Presence | 6 | None | — |
| Ex. 7 | Mfg. Ex. 4 | 0.6 | 0.1 | 85 | 85 | Absence | — | Both sides | 1 |
| Ex. 8 | Mfg. Ex. 5 | 0.6 | 0.1 | 85 | 85 | Absence | — | Both sides | 3 |
| Ex. 9 | Mfg. Ex. 6 | 0.6 | 0.1 | 70 | 85 | Absence | — | Inside only | 1.5 |
| Ex. 10 | Mfg. Ex. 7 | 0.6 | 0.1 | 70 | 85 | Absence | — | Outside only | 1.5 |
| Ex. 11 | Mfg. Ex. 8 | 2.5 | 0.2 | 80 | 85 | Absence | — | None | — |
| Ex. 12 | Mfg. Ex. 9 | 2.5 | 0.2 | 80 | 85 | Absence | — | None | — |
| Ex. 13 | Mfg. Ex. 10 | 2.5 | 0.2 | 80 | 85 | Absence | — | None | — |
| Ex. 14 | Mfg. Ex. 11 | 2.5 | 0.1 | 80 | 85 | Absence | — | None | — |
| Ex. 15 | Mfg. Ex. 1 | 2.5 | 0.1 | 80 | 80 | Absence | — | None | — |
| Ex. 16 | Mfg. Ex. 12 | 2.5 | 0.3 | 80 | 85 | Absence | — | None | — |
| Ex. 17 | Mfg. Ex. 13 | 2.5 | 0.2 | 80 | 85 | Absence | — | None | — |
| Ex. 18 | Mfg. Ex. 14 | 2.5 | 0.2 | 80 | 85 | Absence | — | None | — |
| Comp. Ex. 1 | Mfg. Ex. 15 | 2.7 | 12.1 | 80 | 85 | Absence | — | None | — |
| Comp. Ex. 2 | Mfg. Ex. 16 | 1.7 | 12.1 | 70 | 85 | Absence | — | None | — |
| Comp. Ex. 3 | Mfg. Ex. 16 | 1.7 | 12.1 | 70 | 85 | Presence | 2 | None | — |
| Comp. Ex. 4 | Mfg. Ex. 17 | 0.7 | 11.4 | 85 | 85 | Absence | — | Both sides | 1 |
| Comp. Ex. 5 | Mfg. Ex. 18 | 23.5-27.4 | — | — | — | — | — | — | — |
| Comp. Ex. 6 | Mfg. Ex. 19 | 0.04 | — | — | — | — | — | — | — |
| Comp. Ex. 7 | Mfg. Ex. 20 | 2.5 | 0.2 | 80 | 85 | Absence | — | None | — |
| Comp. Ex. 8 | Mfg. Ex. 21 | 2.3-4.5 | — | — | — | — | — | — | — |
| Comp. Ex. 9 | Mfg. Ex. 22 | 2.6 | 5.5 | 80 | 85 | Absence | — | None | — |

| | | Shaped article | | | | | | | | | |
|---|---|---|---|---|---|---|---|---|---|---|---|
| Examples of molding | Mfg. Examples of random mat used | Thickness of reference plane (S) (mm) | Thickness of standing plane (B) (mm) | Area ratio of standing plane (B)/ reference plane (S) | Mold- ability | Ap- pear- ance | Warp age | Vf (%) of charg- ing part | Vf (%) of fluid- izing part | Tensile modulus ratio (Eδ) of charging part (—) | Tensile modulus ratio (Eδ) of fluid- izing part (—) |
| Ex. 1 | Mfg. Ex. 1 | 2.0 | 2.0 | 35 | Good | Good | Good | 34.6 | 35.0 | 1.09 | 1.08 |
| Ex. 2 | Mfg. Ex. 2 | 2.0 | 2.0 | 12 | Good | Good | Good | 34.2 | 34.8 | 1.00 | 1.05 |
| Ex. 3 | Mfg. Ex. 3 | 2.0 | 2.0 | 2 | Good | Good | Good | 34.9 | 35.0 | 1.08 | 1.02 |
| Ex. 4 | Mfg. Ex. 3 | 2.0 | 2.0 | 2 | Good | Good | Good | 35.3 | 35.3 | 1.00 | 1.02 |
| Ex. 5 | Mfg. Ex. 3 | 2.0 | 2.0 | 2 | Good | Good | Good | 34.6 | 35.0 | 1.09 | 1.08 |
| Ex. 6 | Mfg. Ex. 3 | 2.0 | 2.0 | 2 | Good | Good | Good | 34.6 | 34.9 | 1.07 | 1.08 |
| Ex. 7 | Mfg. Ex. 4 | 1.5 | 1.5 | 2 | Good | Good | Good | 35.1 | 34.7 | 1.05 | 1.07 |
| Ex. 8 | Mfg. Ex. 5 | 1.0 | 1.0 | 2 | Good | Good | Good | 35.0 | 35.0 | 1.05 | 1.03 |
| Ex. 9 | Mfg. Ex. 6 | 2.0 | 2.0 | 2 | Good | Good | Good | 35.1 | 34.9 | 1.03 | 1.05 |
| Ex. 10 | Mfg. Ex. 7 | 2.0 | 2.0 | 2 | Good | Good | Good | 34.9 | 34.3 | 1.05 | 1.09 |
| Ex. 11 | Mfg. Ex. 8 | 2.0 | 2.0 | 2 | Good | Good | Good | 34.8 | 35.3 | 1.05 | 1.07 |
| Ex. 12 | Mfg. Ex. 9 | 2.0 | 2.0 | 2 | Good | Good | Good | 34.9 | 34.3 | 1.05 | 1.05 |
| Ex. 13 | Mfg. Ex. 10 | 2.0 | 2.0 | 2 | Good | Good | Good | 34.7 | 34.0 | 1.06 | 1.05 |
| Ex. 14 | Mfg. Ex. 11 | 4.0 | 4.0 | 2 | Good | Good | Good | 27.0 | 26.0 | 1.05 | 1.03 |
| Ex. 15 | Mfg. Ex. 1 | 2.0 | 2.0 | 3 | Good | Good | Good | 34.8 | 34.3 | 1.05 | 1.07 |
| Ex. 16 | Mfg. Ex. 12 | 2.0 | 2.0 | 2 | Good | Good | Good | 35.2 | 34.7 | 1.03 | 1.06 |
| Ex. 17 | Mfg. Ex. 13 | 2.0 | 2.0 | 2 | Good | Good | Good | 19.8 | 19.0 | 1.07 | 1.09 |
| Ex. 18 | Mfg. Ex. 14 | 2.0 | 2.0 | 2 | Good | Good | Good | 45.3 | 44.5 | 1.05 | 1.09 |
| C. Ex. 1 | Mfg. Ex. 15 | 2.1 | 1.2-1.5 | 35 | Very bad | Very bad | — | 28.3 | 35.7 | 1.10 | 2.40 |
| C. Ex. 2 | Mfg. Ex. 16 | 2.2 | 1.2-1.7 | 2 | Very bad | Very bad | — | 28.3 | 35.7 | 1.08 | 2.75 |
| C. Ex. 3 | Mfg. Ex. 16 | 2.1 | 1.7-2.0 | 2 | Good | Very bad | — | 34.5 | 32.2 | 1.05 | 1.55 |
| C. Ex. 4 | Mfg. Ex. 17 | 1.7 | 1.0-1.5 | 2 | Bad | Very bad | — | 33.1 | 30.1 | 1.11 | 1.93 |
| C. Ex. 5 | Mfg. Ex. 18 | — | — | — | — | — | — | — | — | — | — |
| C. Ex. 6 | Mfg. Ex. 19 | — | — | — | — | — | — | — | — | — | — |
| C. Ex. 7 | Mfg. Ex. 20 | 2.0 | 2.0 | 2 | Good | Good | Good | 35.1 | 33.5 | 1.15 | 1.35 |
| C. Ex. 8 | Mfg. Ex. 21 | — | — | — | — | — | — | — | — | — | — |
| C. Ex. 9 | Mfg. Ex. 22 | 2.1 | 1.5-2.0 | 2 | Very bad | Bad | — | — | — | — | — |

*Vf (%) = Volume fraction of reinforcing fibers

INDUSTRIAL APPLICABILITY

A shaped product of the present disclosure can be utilized in electric and electronic parts such as parts for electrical/electronic equipment, parts for automobiles, personal computers, office automation devices and equipment, audiovisual devices and equipment, mobile phones, telephones, facsimiles, electric household appliances, and toy goods, and casings. In particular, the shaped product may be preferably used in parts for automobiles mounted on environmentally-friendly vehicles.

Although the present disclosure has been described with reference to detailed and specific examples, it is clear to one of ordinary skill in the art that various changes or modifications may be made without departing from the spirit and scope of the present disclosure.

The present application claims priority to and the benefit of Japanese Patent Application No. 2011-189033, filed on Aug. 31, 2011 and Japanese Patent Application No. 2011-189034, filed on Aug. 31, 2011, the disclosures of which are incorporated herein by reference.

REFERENCE SIGNS LIST

1: Reference plane (S) of mold
2: Standing plane (B) of mold
1': Reference plane (S) of shaped product
2': Standing plane (B) of shaped product
3: Standing plane angle
4: Shear angle
5: Clearance
6: Charging part
7: Fluidizing part
8A: Measurement point for Vf and tensile modulus at charging part (Example 1)
8B: Measurement point for Vf and tensile modulus at fluidizing part (Example 1)
9A: Measurement point for Vf and tensile modulus at charging part (Example 2)
9B: Measurement point for Vf and tensile modulus at fluidizing part (Example 2)
10: auxiliary flow path (C) of mold
11: auxiliary flow path (C) of shaped product
12: Thickness of auxiliary flow path (C)
13: Width of auxiliary flow path (C)
14: Cavity clearance (corresponding to thickness of shaped product)
15: Chamfer portion (D) of mold
16: Cavity clearance (corresponding to maximum thickness of chamfer portion (D))

What is claim is:

1. A shaped product comprising:
a fiber-reinforced composite material including reinforcing fibers with an average fiber length of 5 mm or more and 100 mm or less and a thermoplastic resin,
wherein the reinforcing fibers are selected from the group consisting of carbon fibers, aramid fibers, glass fibers, and a combination thereof,
a fiber areal weight of the reinforcing fibers is 25 to 10000 g/m$^2$,
the reinforcing fibers are two-dimensionally oriented and are deposited in a mat form,
a volume fraction of the reinforcing fibers is 5 to 80%,
the shaped product includes a reference plane (S) and a plane (B) (standing plane (B)) inclined at an angle of 45 degrees or more and 90 degrees or less with respect to the reference plane,
a ratio of an area of the standing plane (B) to an area of the reference plane (S) is 0.5 to 100,
in the fiber-reinforced composite material constituting the shaped product, a ratio of the amount of a reinforcing fiber bundle (A) including the reinforcing fibers in the amount of a critical number of single fiber or more, the critical number being defined by Formula (1), to a total amount of the reinforcing fibers is 20 Vol % or more and 99 Vol % or less:

Critical number of single fiber=600/$D$ (1)

wherein D is an average fiber diameter (μm) of single reinforcing fiber,
the fiber-reinforced composite material constituting the shaped product includes a reinforcing fiber bundle constituted by fibers of less than the critical number of single fiber in addition to the reinforcing fiber bundle (A),
the shaped product includes a first portion having a higher volume fraction (Vf) of reinforcing fibers and a second portion having a lower volume fraction (Vf) of reinforcing fibers, the first portion and the second portion together define the entire shaped product, and a ratio of the higher volume fraction to the lower volume fraction is 1.0 to 1.2.

2. The shaped product of claim 1, comprising:
the reference plane (S); and
a standing plane (B') inclined at an angle of 80 degrees or more and 90 degrees or less with respect to the reference plane,
wherein a ratio of an area of the standing plane (B') to the area of the reference plane is 1 to 20.

3. The shaped product of claim 1, further comprising:
an auxiliary flow path (C).

4. The shaped product of claim 3,
wherein a ratio of a thickness (b) of the auxiliary flow path (C) to a thickness (a) of a part of the shaped product at which the auxiliary flow path (C) is provided is 1.1 or more and 30 or less.

5. The shaped product of claim 4,
wherein a ratio of a width (c) of the auxiliary flow path (C) to the thickness (a) of the shaped product is 0.1 or more and 10 or less, and
a cross sectional area (d) of the auxiliary flow path (C) satisfies Formula (3), Cross sectional area ($d$) of the auxiliary flow path ($C$)≥(Thickness ($a$) of the shaped product)× (Thickness ($a$) of the shaped product)×1.05 (3).

6. The shaped product of claim 1, further comprising:
a chamfer portion (D) at a boundary of the reference plane (S) and the standing plane (B).

7. The shaped product of claim 6,
wherein a ratio of a maximum thickness (L2) of the chamfer portion (D) to a thickness (L1) of the shaped product at the standing plane (B) is 0.9 or more.

8. The shaped product of claim 1,
wherein the reinforcing fibers are carbon fibers.

9. The shaped product of claim 1,
wherein a ratio (Eδ) obtained by dividing a higher value by a lower value of tensile modulus values measured in an arbitrary direction and a direction perpendicular to the arbitrary direction is 1.0 to 1.3.

10. The shaped product of claim 1, further comprising:
a flange portion at an end of the standing plane (B).

11. The shaped product of claim 1,
wherein the ratio of the amount of the reinforcing fiber bundle (A) including the reinforcing fibers in the amount of a critical number of single fiber or more to a total amount of reinforcing fibers is 30 Vol % or more to less than 90 Vol %.

12. The shaped product of claim 1,
wherein a thickness of the reference plane (S) is 0.2 mm to 3 mm.

13. The shaped product of claim 1,
wherein the reinforcing fibers are reinforcing fibers that are opened.

14. The shaped product of claim 1, which has no warpage.

15. The shaped product of claim 1, wherein the reinforcing fibers are cut in direction perpendicular to a fiber direction.

16. The shaped product of claim 1, which is obtained by: steps A-1) to A-3) or B-1) to B-4) for performing an impregnation process and a molding process:

- A-1) a step of obtaining a prepreg by heating and pressurizing a random mat to a temperature equal to or higher than a melting point of the thermoplastic resin and lower than a decomposition temperature of the thermoplastic resin when the thermoplastic resin is crystalline or to a temperature equal to or higher than a glass transition temperature of the thermoplastic resin and lower than the decomposition temperature of the thermoplastic resin when the thermoplastic resin is amorphous to impregnate the thermoplastic resin into the reinforcing fiber bundle;
- A-2) a step of arranging the prepreg obtained in step A-1) in a mold whose temperature is adjusted to a temperature lower than the melting point of the thermoplastic resin when the thermoplastic resin is crystalline or to a temperature lower than the glass transition temperature of the thermoplastic resin when the thermoplastic resin is amorphous, and the mold which has a reference plane (S) and a standing plane (B), after the prepreg obtained in step A-1) is heated to a temperature equal to or higher than the melting point of the thermoplastic resin and lower than the decomposition temperature of the thermoplastic resin when the thermoplastic resin is crystalline or to a temperature equal to or higher than the glass transition temperature of the thermoplastic resin and lower than the decomposition temperature of the thermoplastic resin when the thermoplastic resin is amorphous; and
- A-3) a step of pressurizing and molding the prepreg arranged in the mold in step A-2),
- B-1) a step of arranging the random mat in a mold having a reference plane (S) and a standing plane (B);
- B-2) a first press step of pressurizing the random mat while heating the mold to a temperature equal to or higher than a melting point of the thermoplastic resin and lower than a decomposition temperature of the thermoplastic resin when the thermoplastic resin is crystalline or to a temperature equal to or higher than a glass transition temperature of the thermoplastic resin and lower than the decomposition temperature of the thermoplastic resin when the thermoplastic resin is amorphous;
- B-3) a second press step of pressurizing the random mat in at least one pressure step so as to allow a pressure of a final pressure step to be 1.2 to 100 times greater than the pressure of the first press step; and
- B-4) a step of molding the random mat while adjusting a temperature of the mold to be lower than the melting point of the thermoplastic resin when the thermoplastic resin is crystalline and to be lower than the glass transition temperature of the thermoplastic resin when the thermoplastic resin is amorphous, wherein the random mat includes reinforcing fibers with an average fiber length of 5 mm or more and 100 mm or less and a thermoplastic resin, wherein a fiber areal weight of the reinforcing fibers is 25 to 10000 g/m², and a ratio of a reinforcing fiber bundle (A) including the reinforcing fibers of a critical number of single fiber or more, the critical number being defined by Formula (1), to a total amount of the reinforcing fibers is 20 Vol % or more and 99 Vol % or less:

$$\text{Critical number of single fiber} = 600/D \qquad (1)$$

wherein D is an average fiber diameter (μm) of single reinforcing fiber.

17. The shaped product of claim 16, wherein the mold includes a core mold and a cavity mold formed in a shear edge structure, wherein an angle of a shear is in a range of 1 to 5 degrees, and a clearance of a shear edge is 0.01 to 0.2 mm.

18. A method for manufacturing the shaped product of claim 1 by using a random mat including reinforcing fibers with an average fiber length of 5 mm or more and 100 mm or less and a thermoplastic resin, wherein a fiber areal weight of the reinforcing fibers is 25 to 10000 g/m², and a ratio of a reinforcing fiber bundle (A) including the reinforcing fibers of a critical number of single fiber or more, the critical number being defined by Formula (1), to a total amount of the reinforcing fibers is 20 Vol % or more and 99 Vol % or less:

$$\text{Critical number of single fiber} = 600/D \qquad (1)$$

wherein D is an average fiber diameter (μm) of single reinforcing fiber, the method comprising steps A-1) to A-3) for performing an impregnation process and a molding process:

- A-1) a step of obtaining a prepreg by heating and pressurizing the random mat to a temperature equal to or higher than a melting point of the thermoplastic resin and lower than a decomposition temperature of the thermoplastic resin when the thermoplastic resin is crystalline or to a temperature equal to or higher than a glass transition temperature of the thermoplastic resin and lower than the decomposition temperature of the thermoplastic resin when the thermoplastic resin is amorphous to impregnate the thermoplastic resin into the reinforcing fiber bundle;
- A-2) a step of arranging the prepreg obtained in step A-1) in a mold whose temperature is adjusted to a temperature lower than the melting point of the thermoplastic resin when the thermoplastic resin is crystalline or to a temperature lower than the glass transition temperature of the thermoplastic resin when the thermoplastic resin is amorphous, and the mold which has a reference plane (S) and a standing plane (B), after the prepreg obtained in step A-1) is heated to a temperature equal to or higher than the melting point of the thermoplastic resin and lower than the decomposition temperature of the thermoplastic resin when the thermoplastic resin is crystalline or to a temperature equal to or higher than the glass transition temperature of the thermoplastic resin and lower than the decomposition temperature of the thermoplastic resin when the thermoplastic resin is amorphous; and
- A-3) a step of pressurizing and molding the prepreg arranged in the mold in step A-2), or the method including steps B-1) to B-4) for performing an impregnation process and a molding process:

- B-1) a step of arranging the random mat in a mold having a reference plane (S) and a standing plane (B);
- B-2) a first press step of pressurizing the random mat while heating the mold to a temperature equal to or higher than a melting point of the thermoplastic resin and lower than a decomposition temperature of the thermoplastic resin when the thermoplastic resin is crystalline or to a temperature equal to or higher than a glass transition temperature of the thermoplastic resin and lower than the decomposition temperature of the thermoplastic resin when the thermoplastic resin is amorphous;

B-3) a second press step of pressurizing the random mat in at least one pressure step so as to allow a pressure of a final pressure step to be 1.2 to 100 times greater than the pressure of the first press step; and B-4) a step of molding the random mat while adjusting a temperature of the mold to be lower than the melting point of the thermoplastic resin when the thermoplastic resin is crystalline and to be lower than the glass transition temperature of the thermoplastic resin when the thermoplastic resin is amorphous.

19. The method for manufacturing the shaped product of claim 18, wherein the random mat or the prepreg is arranged in the mold to have a charge ratio expressed by Formula (4) in a range of 5% or more and 100% or less:

Charge ratio (%)=100×base material area (mm$^2$)/ total area (mm$^2$) of reference plane (*S*), standing plane (*B*), and flange portion     (4)

wherein the base material area represents a projected area of all the arranged random mat or prepreg in a draft direction.

20. The method for manufacturing the shaped product of claim 18, wherein a molding pressure in step A-3) or in steps B-2) and B-3) is 0.1 MPa to 100 MPa.

21. The method for manufacturing the shaped product of claim 18, wherein the mold includes an auxiliary flow path (C).

22. The method for manufacturing the shaped product of claim 18, wherein the mold includes a chamfer portion (D).

* * * * *